US007509639B2

(12) United States Patent
Worley, Jr.

(10) Patent No.: US 7,509,639 B2
(45) Date of Patent: Mar. 24, 2009

(54) CUSTOMIZED EXECUTION ENVIRONMENT

(75) Inventor: William S. Worley, Jr., Centennial, CO (US)

(73) Assignee: Secure64 Software Corp., Greenwood Village, CO (US)

( * ) Notice: Subject to any disclaimer, the term of this patent is extended or adjusted under 35 U.S.C. 154(b) by 705 days.

(21) Appl. No.: 10/794,995

(22) Filed: Mar. 4, 2004

(65) Prior Publication Data

US 2004/0177243 A1 Sep. 9, 2004

Related U.S. Application Data

(63) Continuation-in-part of application No. 10/789,783, filed on Feb. 27, 2005.

(60) Provisional application No. 60/451,848, filed on Mar. 4, 2003, provisional application No. 60/497,870, filed on Aug. 25, 2003.

(51) Int. Cl.
    *G06F 9/455* (2006.01)
(52) U.S. Cl. .......................... 718/1; 713/164
(58) Field of Classification Search ............ 718/1, 718/100–108; 719/310–332; 713/1–601; 726/2, 16–21
    See application file for complete search history.

(56) References Cited

U.S. PATENT DOCUMENTS

| 4,467,409 | A |   | 8/1984  | Potash et al. |         |
|-----------|---|---|---------|---------------|---------|
| 5,043,878 | A | * | 8/1991  | Ooi           | 712/42  |
| 5,067,069 | A |   | 11/1991 | Fite et al.   |         |
| 5,764,861 | A |   | 6/1998  | Priem et al.  |         |
| 5,826,085 | A | * | 10/1998 | Bennett et al.| 719/316 |
| 5,918,050 | A |   | 6/1999  | Rosenthal et al. |      |
| 5,937,185 | A | * | 8/1999  | Weir et al.   | 703/24  |
| 5,991,803 | A | * | 11/1999 | Glitho et al. | 709/220 |
| 6,131,165 | A | * | 10/2000 | Lipkin et al. | 726/4   |
| 6,154,842 | A | * | 11/2000 | Van Peursem   | 726/22  |
| 7,028,305 | B2| * | 4/2006  | Schaefer      | 719/310 |
| 7,093,265 | B1| * | 8/2006  | Jantz et al.  | 719/321 |
| 2002/0194389 | A1 | * | 12/2002 | Worley et al. | 709/310 |
| 2004/0098727 | A1 | * | 5/2004  | Bjare et al.  | 719/310 |

OTHER PUBLICATIONS

Suh, G. Edward et al. "AEGIS: Architecture for Tamper-Evident and Tamper-Resistant Processing." ACM. Jun. 23-26, 2003.*
Ajmani, Sameer. "A Trusted Execution Platform for Multiparty Computation." Sep. 2000.*
Author Unknown., "Itanium® Processor Family Performance Tuning Guide." pp. 1-49.
Author Unknown., "TCPA PC Specific Implementation Specification." Sep. 9, 2001.

(Continued)

*Primary Examiner*—Lewis A Bullock, Jr.
*Assistant Examiner*—Jue S Wang
(74) *Attorney, Agent, or Firm*—Olympic Patent Works PLLC

(57) ABSTRACT

Methods and techniques for implementing a custom execution environment ($CE^2$) and a related loader are provided. According to one embodiment, the $CE^2$ includes code and data sections of an application and code and data sections of a set of system services. The set of system services has direct and full control of a set of hardware resources of a computer system containing one or more processors implementing a parallel protected architecture. According to one embodiment, the system services are designed for maximum simplicity, fastest possible speed, and elimination of security vulnerabilities.

21 Claims, 16 Drawing Sheets

OTHER PUBLICATIONS

Carroll, A. et al., "Microsoft 'Palladium': A Business Overview Combining Microsoft Windows Features, Personal Computing Hardware, and Software Applications for Greater Security, Personal Privacy and System Integrity." Aug. 2002.

Huang, Andrew., "Keeping Secrets In Hardware: *The Microsoft XBox™ Case Study.*" Aug. 13-15, 2005.

Lettice, John., "Inside Microsoft's Secure OS Project Palladium." The Register., Nov. 12, 2002.

Weinberg, Bill., "Rediscovering UNIX Reliability in Linux®—White Paper." MontaVista Software. 2001.

Witchel, E. et al., "Mondrian Memory Protection." MIT Laboratory for Computer Science.

* cited by examiner

300

| TLB.ar 310 | TLB.pl 320 | Privilege Level 330 | | | | Description |
|---|---|---|---|---|---|---|
| | | 3 | 2 | 1 | 0 | |
| 0 | 3 | R | R | R | R | Read only |
| | 2 | - | R | R | R | |
| | 1 | - | - | R | R | |
| | 0 | - | - | - | R | |
| 1 | 3 | RX | RX | RX | RX | Read, execute |
| | 2 | - | RX | RX | RX | |
| | 1 | - | - | RX | RX | |
| | 0 | - | - | - | RX | |
| 2 | 3 | RW | RW | RW | RW | Read, write |
| | 2 | - | RW | RW | RW | |
| | 1 | - | - | RW | RW | |
| | 0 | - | - | - | RW | |
| 3 | 3 | RWX | RWX | RWX | RWX | Read, write, execute |
| | 2 | - | RWX | RWX | RWX | |
| | 1 | - | - | RWX | RWX | |
| | 0 | - | - | - | RWX | |
| 4 | 3 | R | RW | RW | RW | Read only / read, write |
| | 2 | - | R | RW | RW | |
| | 1 | - | - | R | RW | |
| | 0 | - | - | - | RW | |
| 5 | 3 | RX | RX | RX | RWX | Read, execute / read, write, execute |
| | 2 | - | RX | RX | RWX | |
| | 1 | - | - | RX | RWX | |
| | 0 | - | - | - | RWX | |
| 6 | 3 | RWX | RW | RW | RW | Read, write, execute / read, write |
| | 2 | - | RWX | RW | RW | |
| | 1 | - | - | RWX | RW | |
| | 0 | - | - | - | RW | |
| 7 | 3 | X | X | X | RX | Execute, promote / read, execute |
| | 2 | XP2 | X | X | RX | |
| | 1 | XP1 | XP1 | X | RX | |
| | 0 | XP0 | XP0 | XP0 | RX | |

| 63 | 32 | 8 | 4 | 3 | 2 | 1 | 0 |
|---|---|---|---|---|---|---|---|
| rv | Key 360 | rv | | xd 370 | rd 372 | wd 374 | v 380 |
| 32 | 24 | 4 | | 1 | 1 | 1 | 1 |

Figure 3B

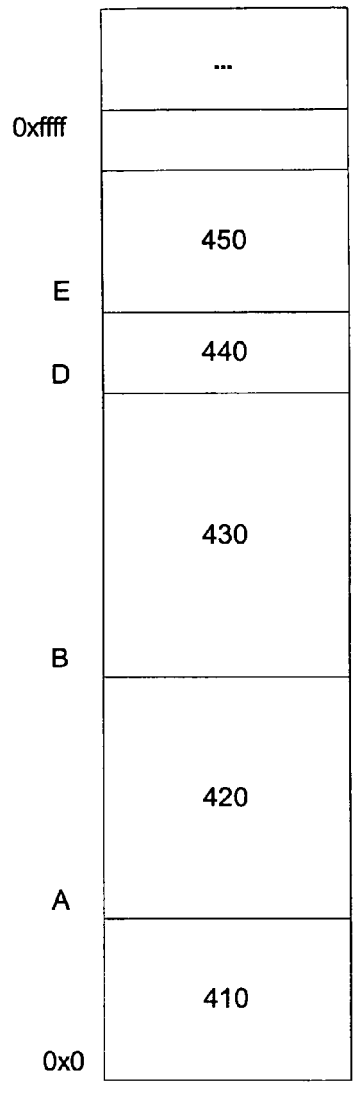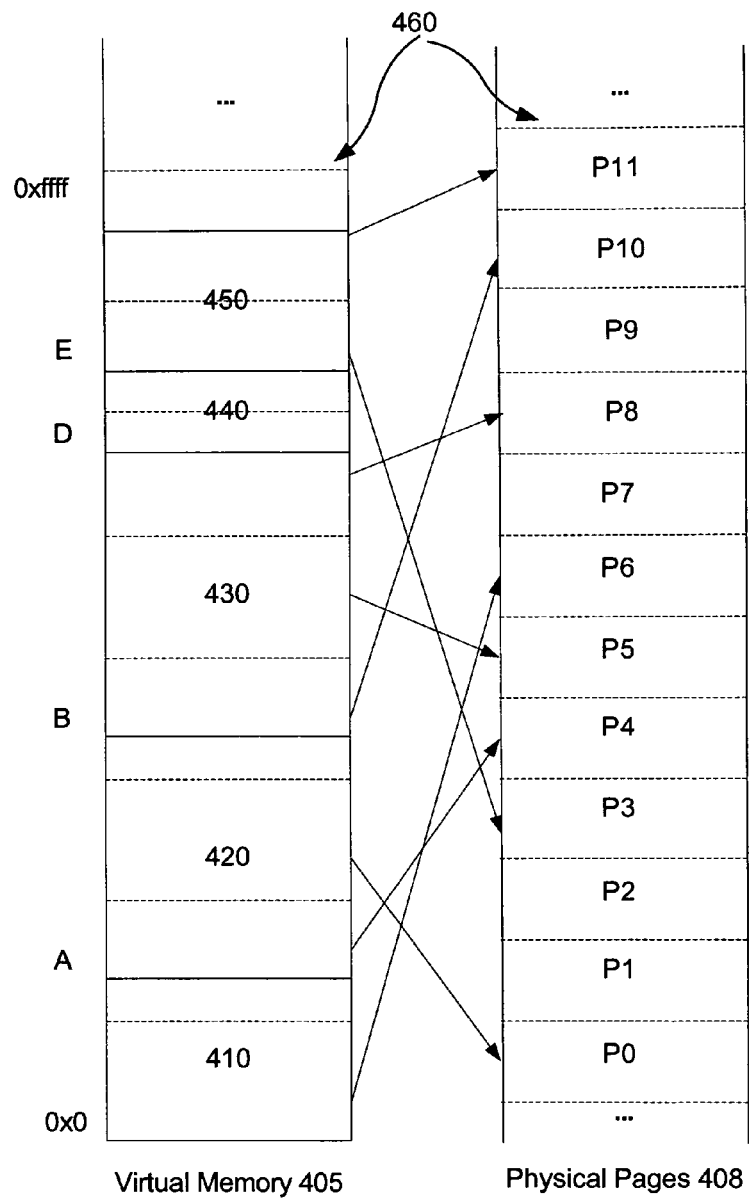
**Figure 4A
(Prior Art)**
**Figure 4B
(Prior Art)**

570

Phys Addr: 0000000000100000 Size: 1mb
Phys Addr: 0000000000200000 Size: 1mb
Phys Addr: 0000000000300000 Size: 1mb
Phys Addr: 0000000000400000 Size: 4mb
Phys Addr: 0000000000800000 Size: 4mb
Phys Addr: 0000000000C00000 Size: 4mb
Phys Addr: 0000000001000000 Size: 16mb
Phys Addr: 0000000002000000 Size: 16mb
Phys Addr: 0000000003000000 Size: 16mb
Phys Addr: 0000000004000000 Size: 64mb
Phys Addr: 0000000008000000 Size: 64mb
Phys Addr: 000000000C000000 Size: 64mb
Phys Addr: 0000000010000000 Size: 256mb
Phys Addr: 0000000020000000 Size: 256mb
Phys Addr: 0000000030000000 Size: 64mb
Phys Addr: 0000000034000000 Size: 64mb
Phys Addr: 0000000038000000 Size: 64mb
Phys Addr: 000000003C000000 Size: 16mb
Phys Addr: 000000003D000000 Size: 16mb
Phys Addr: 000000003E000000 Size: 16mb
Phys Addr: 000000003F000000 Size: 4mb
Phys Addr: 000000003F400000 Size: 4mb
Phys Addr: 000000003F800000 Size: 1mb
Phys Addr: 000000003F900000 Size: 256kb
Phys Addr: 000000003F940000 Size: 256kb
Phys Addr: 000000003F980000 Size: 256kb
Phys Addr: 000000003F9C0000 Size: 64kb
Phys Addr: 000000003F9D0000 Size: 64kb
Phys Addr: 000000003F9E0000 Size: 64kb

580

Phys Addr: 0000004040000000 Size: 1gb
Phys Addr: 0000004080000000 Size: 1gb
Phys Addr: 00000040C0000000 Size: 256mb
Phys Addr: 00000040D0000000 Size: 256mb
Phys Addr: 00000040E0000000 Size: 256mb
Phys Addr: 00000040F0000000 Size: 64mb
Phys Addr: 00000040F4000000 Size: 64mb
Phys Addr: 00000040F8000000 Size: 64mb
Phys Addr: 00000040FC000000 Size: 16mb
Phys Addr: 00000040FD000000 Size: 16mb
Phys Addr: 00000040FE000000 Size: 16mb
Phys Addr: 00000040FF000000 Size: 1mb
Phys Addr: 00000040FF100000 Size: 1mb
Phys Addr: 00000040FF200000 Size: 256kb
Phys Addr: 00000040FF240000 Size: 256kb
Phys Addr: 00000040FF280000 Size: 64kb
Phys Addr: 00000040FF290000 Size: 64kb
Phys Addr: 00000040FF2A0000 Size: 16kb

590

Phys Addr: 00000040FFA00000 Size: 1mb
Phys Addr: 00000040FFB00000 Size: 1mb
Phys Addr: 00000040FFC00000 Size: 1mb
Phys Addr: 00000040FFD00000 Size: 256kb
Phys Addr: 00000040FFD40000 Size: 64kb
Phys Addr: 00000040FFD50000 Size: 64kb
Phys Addr: 00000040FFD60000 Size: 16kb
Phys Addr: 00000040FFD64000 Size: 16kb
Phys Addr: 00000040FFD68000 Size: 16kb

Figure 5B

CUSTOMIZED EXECUTION ENVIRONMENT

This application is a continuation-in-part of application Ser. No. 10/789,783, filed Feb. 27, 2005 and claims the benefit of Provisional Application No. 60/451,848, filed Mar. 4, 2003 and Provisional Application No. 60/497,870, filed Aug. 25, 2003, all of which are hereby incorporated by reference in their entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright 2003-2004, Secure64 Software Corporation.

BACKGROUND

1. Field

Embodiments of the present invention generally relate to the field of application execution environments. More particularly, embodiments of the present invention relate to application execution environments that are highly tuned for a particular class of hardware instruction set architectures and that employ the protective features of those instruction sets to reduce security vulnerabilities.

2. Description and Shortcomings of the Related Art

The approach adopted by modern general-purpose operating systems has been to define and implement multiple levels of abstractions on top of the actual processor hardware. Such abstractions include multiple virtual memories, multiple tasks (a.k.a. processes or threads), files, sockets, interrupt handlers, semaphores, spin locks, time of day clocks, interval timers, etc.

Some of these abstractions are implemented in the kernels of the respective operating systems, which typically exercise complete control over the actual computational resources of a processor. Such kernels execute at the highest privilege level provided by the processor, enabling the programs comprised by the kernel to execute the "privileged instructions" of the processor instruction set. Operating system kernels manage the creation, scheduling, coordination, and destruction of instances of such abstractions. They also provide for appropriate handling of the entire range of synchronous and asynchronous faults, traps, aborts, and interruptions defined by the hardware processor architecture.

Control of integrated or plug-in input/output (I/O) device control adapters are implemented by programs called drivers (a.k.a. I/O drivers or Local Area Network (LAN) drivers or <device> drivers, where <device> is a particular peripheral, bus, or function name). Such drivers also are permitted to execute at the highest privilege level provided by the processor. The amount of code comprised by the drivers usually is larger than the code for operating system kernels themselves.

Other elements implement abstractions built on top of the operating system kernel and I/O drivers. These include file systems, network stacks, synchronization primitives, signaling mechanisms, sockets interfaces, graphical user interfaces, and various libraries of system services. These elements combine with operating system kernels and I/O drivers to provide an interface to application programs that can be realized on many different hardware platforms.

The primary purpose in defining the multiple levels of abstraction provided by general-purpose operating systems has been to develop Application Programming Interfaces (APIs) that can be implemented across systems employing incompatible processor and platform hardware and firmware architectures. While the program of defining and implementing the multiple layers of abstraction found in today's Unix, Linux, and Windows operating systems (ULW systems), which may be referred to herein as "Principal Operating Systems," is important, and has been successful in achieving portability, the result has not been achieved without performance penalties and other negative effects. Two primary such effects will be called the "lowest common denominator" (LCD) effect and the "semantic mismatch" (SM) effect. The first of these effects has resulted in the inability of ULW operating systems to benefit from powerful capabilities present only on some processors. The latter effect manifests either in excessive performance overheads or in system-level functional deficiencies such as scalability and security.

Operating system portability, particularly in ULW systems, has in practice led to two basic categories of consensus. First, there is a broad consensus among the ULW systems as to which abstractions are supported in an API. One cannot find, for example, significant differences among the virtual memory, process-thread-task, file, network, and interruption abstractions of the ULW systems. The uniformity among APIs, of course, enables application portability. Second, there is a consensus as to which subset of hardware capabilities are supported. This subset of capabilities properly can be labeled the architectural LCD.

In the mid 1960s, with the introduction of IBM's System/360, the operating system structure based upon two hardware-enforced levels of privilege was established. The operating system kernel (at the time called the "Nucleus") and other critical system control code executed at the high hardware privilege level. Other code, including application codes, executed at the low hardware privilege level.

Although several important instruction set architectures subsequently have offered four levels of hardware privilege, as well as other advanced protective mechanisms, the ULW operating systems never have supported these features because such support could not also run upon those processors still providing only two levels of hardware privilege. In fact, due to the hardware LCD effect, the ULW operating systems today persist in supporting basically the 1960's privilege model, with a few extensions for read, write, and execute privilege controls. The only truly significant change has been the explosive growth in the amount of code that now executes at the highest level of hardware privilege, a result neither intended nor foreseen by the IBM System/360 architects.

More powerful addressing protection capabilities, such as those offered by PA-RISC® and the Itanium® systems, remain entirely unused by ULW operating systems. And for highly secure systems, in particular, there is compelling need to use such finer-grained memory protection capabilities, beyond those that are common to every manufacturer's processors. Support for such capabilities simply is unavailable from any of the ULW general-purpose operating systems, thereby making more difficult the construction of operating systems that can be highly secure. In ULW systems, for example, it is known to be unsafe to store cipher keys and cipher keying materials in main memory for long periods of time,[1,2] even though this can be done safely using the protection capabilities provided by the Itanium architecture in the manner described in this Application. A computer architecture that includes at least the explicit instruction level parallelism and protection capabilities of the Itanium 2 processors shall be referred to herein as a "Parallel Protected Architecture" (PPA).

[1] Niels Ferguson & Bruce Schneier, "*Practical Cryptography*", Wiley, 2003.
[2] Adi Shamir & Nicko Van Someren, "Playing hide and seek with stored keys." 22 Sep. 1998.

The first category of abstraction consensus provided by the ULW operating systems, like the hardware LCD consensus, also results in the collection of functional shortcomings which may be referred to herein as the SM effect. While the generally accepted operating system abstractions are suitable for a significant and broad class of applications, they are not ideal in every case. No computing structure can be all things to all applications. But having to map all applications into the generally accepted ULW API abstractions flies in the face of this fact. In important cases, the ULW operating system abstractions prevent full use of underlying hardware performance and protection capabilities.

Some applications simply cannot work within the limitations of ULW constraints. Obvious examples are real-time applications, where the system always must respond within strict time constraints. General-purpose operating systems usually provide parameters for tuning themselves for the best responses they are able to achieve. However, they cannot always meet the requirements of stringent real-time applications. System designers have addressed such problems in various ways. Some have embedded a general-purpose operating system within an underlying real-time kernel. In this structure, the real-time kernel controls the applications that require guaranteed responsiveness, and the general-purpose operating system controls the rest. Other designers have chosen specialized real-time operating systems, and simply abandoned the attempt to use general-purpose operating systems.

Many applications can be made to function within general-purpose operating systems, but only at the cost of overheads that can substantially reduce system performance. The abstractions provided by the principal general-purpose operating systems are realized only by complexity and the expenditure of lots of hardware cycles. The abstractions also have been found not to be low overhead constructs, particularly when considering scalability and security. Consequently, if an application's objectives include security, maximum possible throughput, and shortest possible response time, the consensus abstractions of general-purpose operating systems can constitute impediments to meeting these objectives.

For the most part, major ULW operating system developments always have resulted in longer schedules than estimated, larger resulting code bases than expected, and slower performance than desired. Catastrophes have been avoided, however, because the concurrent progress of hardware memory sizes and processor speeds have compensated for the size and performance shortfalls of operating system software. At the same time, little attention seems to have been paid to what application performance might be were it able fully to use the hardware advances of a PPA processor without the cumulative software overheads of general-purpose operating systems.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which:

FIG. 3A is a diagram of the page access rights that may be specified in an Itanium embodiment of the present invention.

FIG. 3B is a diagram of the contents of a protection key register in an Itanium embodiment of the present invention.

FIG. 4A conceptually illustrates the organization of physically addressed sections of code or data by a first generation general-purpose operating system, such as the DOS operating system for the IBM System/360.

FIG. 4B conceptually illustrates the organization of virtually addressed sections of code or data, and their mappings to physical pages, by traditional general-purpose operating systems, such as the ULW systems.

FIG. 5B is an example illustrating an actual organization of physical pages according to one Itanium embodiment of the present invention.

SUMMARY

Figure 1:
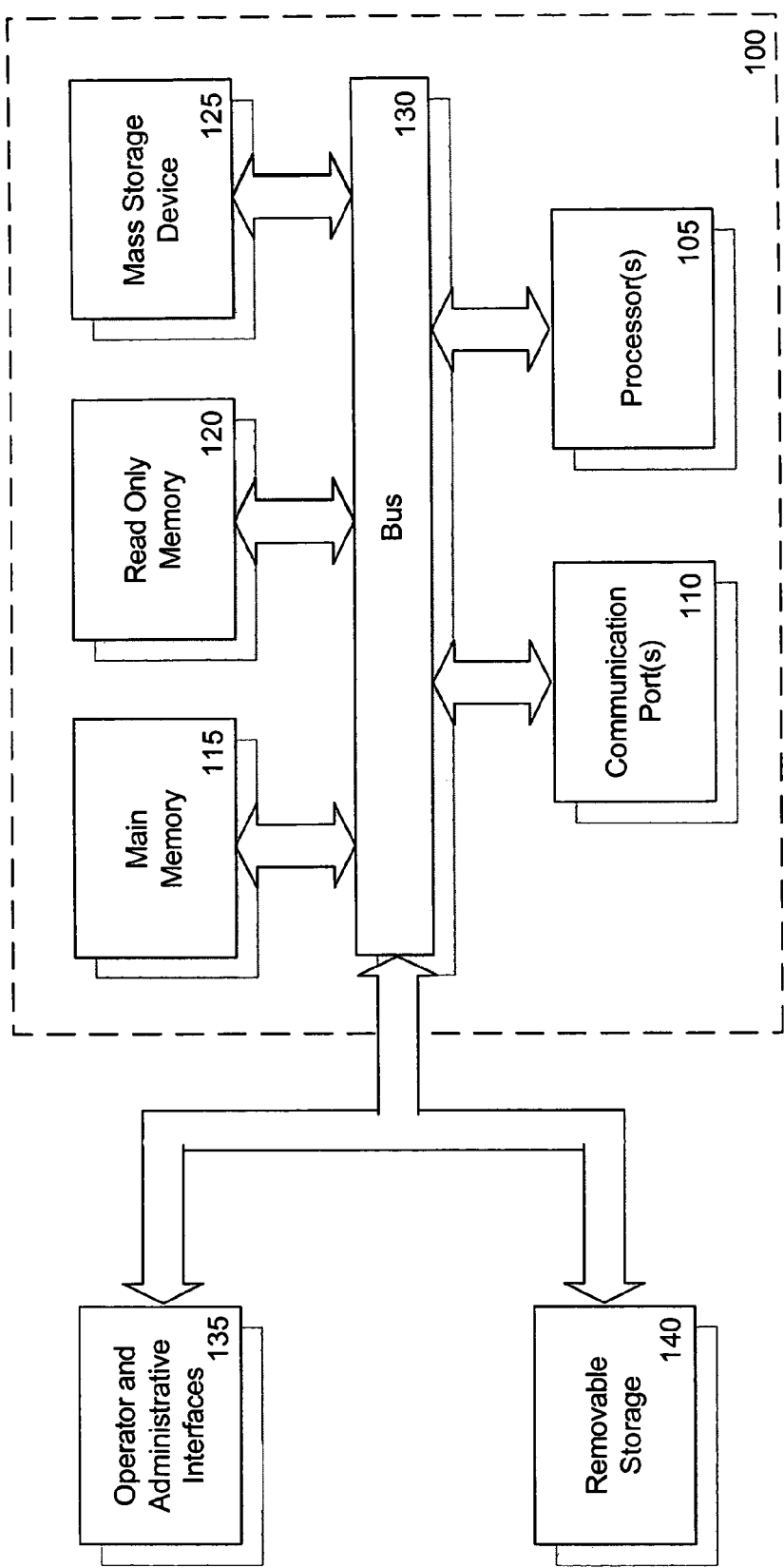
FIG. 1 is an example of a computer system with which embodiments of the present invention may be utilized.

Methods and techniques for implementing a custom execution environment ($CE^2$) and a related loader are described. According to one embodiment, the $CE^2$ includes code and data sections of an application and code and data sections of a set of system services. The set of system services has direct and full control of a set of hardware resources of a computer system containing one or more processors implementing a parallel protected architecture.

Other features of embodiments of the present invention will be apparent from the accompanying drawings and from the detailed description that follows.

DETAILED DESCRIPTION

Methods and techniques for implementing an application execution environment are described. Broadly stated, embodiments of the present invention seek to provide high-performance application execution environments that function on hardware platforms employing one or more "Parallel Protected Architecture" (PPA) processors, such as Intel Itanium 2 processors. Application execution environments implemented in accordance with the teachings provided herein may provide maximum performance and eliminate security vulnerabilities. According to various embodiments of the present invention, application execution environments may exercise complete control over a hardware platform, or may exercise complete control over a first partition of the system resources while operating concurrently with an operating system which has surrendered control of said first or more partitions of system resources to one or more concurrent application execution environments, while the operating system itself continues to manage a second partition of system resources. In the first case, the application execution environment may be referred to as a "Custom Execution Environment" ($CE^2$); in the latter case the application execution environment may be referred to as a "Concurrent Custom Execution Environment" ($C^2E^2$) and the operating system that has surrendered control of said first partition of system resources to the CE may be referred to as a "Symbiotic General-Purpose Operating System" (SGPOS) which is described in co-pending application Ser. No. 10/789,783 filed Feb. 27, 2004.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by operator configuration, hardware components, or may be embodied in machine-executable instructions, which may be used to cause a general-purpose or special-purpose processor programmed with the instructions to perform the steps. Alternatively, the steps may be performed by a combination of operator configuration, hardware, software, and/or firmware.

Embodiments of the present invention may be provided as a computer program product, which may include a machine-readable medium having stored thereon instructions that are used to program a computer (or other electronic devices) to perform a process. The machine-readable medium include, but is not limited to, magnetic disks, floppy diskettes, optical disks, compact disc read-only memories (CD-ROMs, CD-Rs, CD-RWs), digital versatile disks (DVD-ROM, DVD+RW), and magneto-optical disks, ROMs, random access memories (RAMS), erasable programmable read-only memories (EPROMs), electrically erasable programmable read-only memories (EEPROMs), magnetic or optical cards, and flash memory. Moreover, embodiments of the present invention may also be downloaded as a computer program product, wherein the program may be transferred from a remote computer to a requesting computer by way of data signals embodied in carrier wave or other propagation medium via a communication link (e.g., a modem or network connection).

Terminology

Brief definitions of terms, abbreviations, and phrases used throughout this application are given below.

1. The following terms are defined by computer architectures such as the Intel Itanium® architecture, the Hewlett Packard PA-RISC® architecture, or the IBM PowerPC® architecture, and by hardware platforms based upon processors that implement these architectures. Some of the terms are unique to the Itanium architecture.

a. The term "physical address" denotes an encoded numeric value used by hardware directly to access a specific location within a hardware platform's physical memory.

b. The term "virtual address" denotes an encoded numeric value used indirectly to access a specific location within a hardware platform's memory. Before accessing the memory, this address first is translated into a physical address, by a translation that software may specify (by means provided by a processor architecture) and processor hardware executes, before accessing the physical memory.

c. The term "region" denotes a larger encoded numeric value that replaces a smaller encoded numeric value specified in a fixed number of high order bits of a virtual address. For Itanium 2 processors, the larger value is 24 bits in length, and the smaller value is 3 bits in length. The replacement occurs whenever processor hardware translates a virtual address into a physical address.

d. The term "region register" (RR) denotes a hardware register containing the larger encoded value used when the processor hardware translates a virtual address into a physical address.

e. The term "page" denotes a contiguous area of memory identified by its first address ("page address") and its size (number of bytes). Allowable page sizes, often including 4 KB bytes or 8 KB bytes, are defined by each processor architecture. Translations of virtual addresses to physical addresses occur for the fixed size page containing the virtual address.

f. The term "physical page" denotes a page addressed by its physical address.

g. The term "virtual page" denotes a page addressed by the virtual address system software has specified for it.

h. The term "access rights" (AR) denotes which types of accesses to memory by a processor are allowed or not allowed. The types of access are "read" meaning the processor may read the contents of memory, "write" meaning the processor may write the contents into memory, and "execute" meaning the processor may execute the contents of memory as an instruction". Disallowed accesses generate a hardware interruption.

i. The term "protection key" (PK) denotes an encoded value that must be present in a processor control register in order to access a virtual page of memory. For Itanium 2 processors, the PK is encoded in 24 bits.

j. The term "protection key register" (PKR) denotes a processor control register that contains a PK, as well as other control information. See FIG. 3B.

k. The term "hardware privilege level" denotes the current level of privilege at which a processor is executing. Many architectures define two such levels of privilege; others, such as the Itanium architecture define four such levels. Executing at a lower privilege level restricts the instructions that may be executed without causing an interruption.

l. The terms "PL3", "PL2", "PL1", and "PL0" name the hardware privilege levels defined by the Itanium architecture. PL0 is the highest privilege level; PL3 is the lowest privilege level. (opposite of PL numeric label).

m. The term "EPC page" denotes a virtual page within which an enter protected code (epc) instruction may raise the hardware privilege level.

n. The term "translation lookaside buffer" (TLB) denotes a processor control register used to translate a virtual address to a physical address in the fastest possible manner. In effect, a TLB remembers the translation for a particular virtual page.

o. The terms "thread" or "thread of execution" denote the execution of successive instructions within a particular state of processor control registers. When a processor is executing two applications concurrently, it actually executes briefly in one application thread, then switches to and executes briefly in another application thread, back and forth.

p. The term "interruption" denotes an occurrence where a processor halts the normal sequence of instruction execution, and directs control to system software that determines what has occurred and what needs to be done about it.

q. The term "exception" denotes an interruption that occurs either just before or just after execution of the instruction that causes the interruption.

r. The term "interrupt" denotes an interruption that occurs as the result of a system event, such as completion of an elapsed timer interval or signal from an I/O adapter, rather than as the result of execution of a particular instruction.

s. The term "register save engine" (RSE) denotes a facility in Itanium processors that saves, restores, and renames the "stacked" general registers (R32-R127) to give software the appearance of an unlimited number of general registers.

t. The term "register save engine stack" (RSES) denotes the memory used by the RSE to save and restore general registers.

2. The following terms are defined by firmware or software. Some of the terms are unique to Itanium systems.

a. The term "software stack" (SWS) denotes the memory used as a LIFO stack by software.

b. The term "section" denotes a collection of software code or data images that are linked together and located together in memory.

c. The term "BSS" denotes a data section that occupies memory that is to be cleared when loaded into memory. The memory that comprises BSS pages I also called a "heap".

d. The term "entry vector" (EV) denotes a vector of instruction sequences, each of which corresponds to a particular system event and is set to direct control to the proper code should the corresponding event occur.

e. The term "extensible firmware interface" (EFI) is the name of a standard firmware interface provided by hardware platforms incorporating Intel Pentium or Itanium processors. This is the interface used by operating system of other executable environment loaders.

f. The term "boot services" denotes a set of services provided by the EFI firmware when booting a system and loading an operating system or other control program.

g. The term "monarch processor" denotes the particular processor executing the EFI firmware. In a multiprocessor system, the monarch processor does most the early work, then, when the system is ready, activates the other processors.

h. The terms "hardware platform control service" or "platform control service" (PCS) denote a particular set of system services provided by embodiments of the present invention.

i. The term "interruption service routine" denotes software that executes while interruptions remain disabled following occurrence of an interrupt.

j. The term "deferred interruption service routine" denotes software that executes as a result of the occurrence of an interrupt, but in the normal execution context, after interruptions are once again enabled.

3. The term "GUI" denotes a graphical user interface, such as that provided by an Internet browser or Microsoft Windows® operating system.

4. The terms "digital signature" or "cryptographic digital signature" denotes the result of computing a cryptographic hash value, such as SHA-1, over a specific body of encoded data, then encrypting the hash value using a private key. Given the same body of encoded data, recomputing the hash value, and decrypting the digital signature using the corresponding public key, will produce the identical value if the encoded data remains the same.

5. The terms "connected" or "coupled" and related terms are used in an operational sense and are not necessarily limited to a direct physical connection or coupling.

6. The phrase "Concurrent Customized Execution Environment" or "$C^2E^2$" generally refers to a Customized Execution Environment that coexists with a general-purpose operating system and shares at least a means of communication with the general-purpose operating system.

7. The phrase "Customized Execution Environment" or "$CE^2$" refers to a customized operating environment itself, in which there is provided a set of system services implemented in software having direct access and full control over a portion of system resources. $CE^2$s are quite distinct from an operating system or specialized operating system and are characterized by:

a. A $CE^2$ comprise both statically linked system code and data modules and application code and data modules;

b. A $CE^2$ lack the capability to load or load and execute any other application;

c. The functional capabilities of a $CE^2$ are limited only to those services required by a particular application or small set of applications;

d. A $CE^2$ falls far short of the capabilities expected of an operating system; e.g. applications are limited to a single thread of execute on each of one or more processors controlled by the $CE^2$;

e. The services interface of a $CE^2$ are simple and specialized for each of one or a small set of particular applications, rather than being comprised by a complex and general Application Programming Interface (API) for a broad class of applications;

f. A $CE^2$ uses hardware capabilities not supported by a general-purpose or symbiotic general-purpose operating system;

g. A $CE^2$ makes substantial use of hardware capabilities not well utilized by a general-purpose or symbiotic general general-purpose operating system;

h. The services provided to the application within a $CE^2$ are designed to enable an application far more easily to recover and continue from a system error.

Additionally, CE²s may be further characterized by:
  i. Management strategies for system resources within a CE² differ entirely from those strategies adopted by traditional general-purpose operating system;
  j. According to one embodiment of the present invention, a general-purpose operating system at least temporarily relinquishes control of all or a portion of system resources associated with a computer system to one or more CE²s. According to another embodiment, a CE² may be booted on hardware directly. For example, a general-purpose operating system may launch a CE² without ever taking control over the portion of system resources to be controlled by the CE². In still another embodiment, both the general-purpose operating system and one or more CE² may be booted into distinct hardware partitions such as those provided in the Hewlett Packard Superdome platform. CE² are typically specialized for a particular hardware platform. According to one embodiment, a CE² is non-portable and there are no general-purpose operating system abstractions interposed between the customized execution environment and the system resources allocated to the customized execution environment. Typically, system services provided by a CE² will implement a simplified computational structure and/or an I/O structure that are tuned for a particular application. For example, a CE² may take advantage of certain processor or other system resource features that are not exploited by the general-purpose operating system. According to one embodiment, a tuned CE² is provided to support a web edge engine, such as a web server, secure web server, proxy server, secure proxy server or other application or communication servers, to allow the web edge engine to drive the utilization of network connections as close as possible to 100%.

8. The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

9. If the specification states a component or feature "may", "can", "could", or "might" be included or have a characteristic, that particular component or feature is not required to be included or have the characteristic.

10. The phrase "offload board" generally refers to a separate plug-in board, such as a separate plug-in board that may support higher level interfaces and employ additional processing cycles to deal with higher volume network or other processing loads. In one embodiment, such a board may be employed solely to assist in securely booting.

11. The phrase "Parallel Protected Architecture" or "PPA" generally refers to a computer architecture that includes at least the explicit instruction level parallelism and protection capabilities of the Itanium 2 processors.

12. The phrases "principal general-purpose operating systems" or "ULW systems" generally refers to current and future versions of the UNIX, Linux, and Windows operating systems.

13. The phrase "Symbiotic General-Purpose Operating System" or "SGPOS" generally refers to an operating system, such as one of the principal general-purpose operating systems, which has been enhanced to include one or more of the following capabilities: (1) a mechanism to manage the resources of a computer system in cooperative partnership with one or more CE²s; (2) a mechanism to partition/compartmentalize system resources and transfer control of one or more partitions of system resources, including processors, physical memory, storage devices, virtual memory identifier values, I/O devices, and/or exception delivery, to one or more CE²s; and (3) a mechanism to allow communications between partitions of systems resources. SGPOSs might remain portable or could become specialized for a particular hardware platform.

14. The term "responsive" includes completely or partially responsive.

15. The phrase "system resources" generally refers, individually or collectively, to computational resources and/or other resources of a computer system, such as processors, physical memory, storage devices, virtual memory identifier values, input/output (I/O) devices, exception delivery and the like.

16. The phrases "web engine" and "web edge engine" generally refer to hardware, firmware and/or software that support one or more web protocols.

17. The phrase "web protocols" generally refers to current and future application layer networking protocols, including, but not limited to HyperText Transfer Protocol (HTTP), Secure HTTP (S-HTTP), Secure Sockets Layer (SSL), Transport Control Protocol (TCP), Internet Protocol (IP), Transport Layer Security (TLS), Extensible Markup Language (XML), Simple Object Access Protocol (SOAP), Universal Description, Discovery, and Integration (UDDI), DHTTP, HTTP/NG, File Transfer Protocol (FTP), Trivial File Transfer Protocol (TFTP), Common Open Policy Service (COPS), Flow Attribute Notification Protocol (FANP), Finger User Information Protocol, Internet Message Access Protocol rev 4 (IMAP4), IP Device Control (IPCD), Internet Message Access Protocol version 4rev1 (ISAKMP), Network Time Protocol (NTP), Post Office Protocol version 3 (POP3), Radius, Remote Login (RLOGIN), Real-time Streaming Protocol (RTSP), Stream Control Transmission Protocol (SCTP), Service Location Protocol (SLP), SMTP—Simple Mail Transfer Protocol (SMTP), Simple Network Management Protocol (SNMP), SOCKS, TACACS+, TELNET, and Web Cache Coordination Protocol (WCCP).

18. The phrase "web resource" generally refers to a network data object or service that can be identified by a Universal Resource Identifier (URI).

19. The phrase "web server" generally refers to hardware, firmware and/or software that supports one or more web protocols and serves web resources, such as web pages and the output of web applications, to web users. Examples of currently available web servers include Apache available from The Apache Software Foundation; Zeus Web Server available from Zeus Technology with offices in Cambridge, UK and Santa Clara, Calif.; Microsoft's Internet Information Server (IIS); Novell's Web Server; and IBM's family of Lotus Domino servers.

Overview

Secure64™ web edge engines seek to offer the world's best performance and the world's best security. Secure64 web edge engines will scale seamlessly from appliances employing single or dual processors, to full web servers employing hundreds of processors and concurrently executing customer applications and dynamic content generators. Advanced content acceleration and cryptographic security and privacy protections will be provided throughout the product line. (SE-CURE64 is a trademark of Secure64 Software Corporation of Englewood, Colo.).

Secure64 web edge engines will support a wide range of current and future web protocols. While for convenience, embodiments of the present invention are described herein with reference to exemplary web edge engines, such as application servers, web servers and proxy servers, the enabling technologies described herein are broad based, and widely applicable to a variety of other network products, including, but not limited to: content accelerators, caching accelerators, firewalls, smart routers, filters, gateways, firewalls, and tunnels.

In addition, for sake of brevity, embodiments of the present invention are described with reference to specific computer architectures, such as the Itanium architecture that provides explicit instruction level parallelism and protection capabilities. Nevertheless, embodiments of the present invention are equally applicable to various other current or future computer architectures that support minimum Parallel Protected Architecture features.

Design Principles

Various embodiments of the present invention, employing Intel Itanium 2 processors are described herein. Those skilled in the state of the art readily can perceive how to apply the design principles to other PPA architectures, or how partially to apply these principles to non-PPA architectures. A preferred embodiment of the present invention is based upon one or more of the following design principles.

1. Eschew Needless Abstraction.

Design for maximum simplicity and performance, rather than portability and generality. Traditional ULW paged virtual memory, tasks and threads, synchronization mechanisms, file systems, signals, socket models, and fully general networking are not required, and are not provided. Provide only the minimum set of system control functions. Simplicity is essential for security.

2. Optimize the Application and Environment for the Processor.

Make full use of the PPA processor capabilities to maximize performance and eliminate security vulnerabilities. This principle contrasts sharply with the de-facto ULW principle: "use only hardware LCD capabilities."

3. Integrate System and Application Using a Single Thread Per Processor.

Execute only a single thread on each processor. Each processor actually executes only one thread of execution. In a traditional multi-threaded operating system, only one thread on each processor ever is active at a given time. The $CE^2$ relies upon the structure of a single-threaded application to control and balance the distribution of computational cycles to the application's various responsibilities. Similarly, it relies upon a single-threaded system control structure to coordinate required system tasks.

4. Design for Direct Multi-Processor Scalability.

Computational resource sharing is at the granularity of a processor, rather than at the finer granularity of: a thread within a plurality of tasks within a plurality of processors. Again, the system relies upon application and system control functions, each controlling one or more processors, to distribute and coordinate the work. Direct use of the Itanium atomic synchronization instructions provides the means for applications to synchronize such control.

5. Design for Ever-Increasing Network Bandwidth.

Minimize the overheads for high bandwidth network traffic. In addition, provide for offloading socket and TCP/IP function to offload boards. Current system utilization can be raised extensively by concurrently servicing several 1 GB/sec Ethernet connections. A recent study reported 95% central processing unit (CPU) utilization for concurrently servicing four 1 Giga-bit (GB)/sec connections on a two processor, 3 MHz Xeon system.[3] When 10 GB/sec connections emerge, traditional system structures will be unable to cope with the resulting system overheads.

[3] IEEE Computer Elements Workshop, Vail, Colo., June 2003.

6. Create and Allocate Resources Statically.

Whenever possible, construct and allocate resources at compile or system load time. When resource allocations must be adjusted for parameters of a particular configuration, such allocation ideally should be done only once, at system initialization time.

7. Compartmentalize.

At all privilege levels of the $CE^2$ architecture, software code images and data must be organized into protection domains called compartments. Data and instruction accesses within a compartment are enabled by the presence of a corresponding Itanium "Protection IDs" (PIDs). The contents of a protection ID register also can be set to prevent read, write, and execute access, in any combination, to code and data within a compartment. Compartmentalization provides strong security properties, as well as isolation of programming bugs that heretofore were untraceable.

8. Enforce Minimum Required Privileges.

$CE^2$ design practices include specification and enforcement of minimum required access privileges for all code and data images within the system. Thus, code images may be executed, but never read or written. This makes it impossible for an attacker to gain or exploit access by modifying executable code. Software stacks may be read or written, but never executed. This makes it impossible for an attacker to execute a malicious payload from a software stack. Data areas may be read-only, write-only, or both readable and writable, regardless of the privilege level of the executing code. But data areas never can be executable. This makes it impossible for malicious code to be executed from a data area. Itanium RSE stacks will occupy memory that requires the highest privilege level to be read or written. All call return addresses will be saved in RSE stacks. This makes it impossible for an attacker to hijack control by modifying a call return address.

9. Systematically Secure Code Images.

The preceding principle described the executable state of a code image. Systematically securing such code images requires that this executable state be reached only through the following sequence of states. When a code image first is read into a memory area, that memory area will have write, but not read or execute permissions. Once the image has been written into the memory area, if the image is to be decrypted a cryptographic service is then permitted to read and write the image area. Once the cryptographic service has decrypted the image, the access privileges are then set to read-only. If no decryption is required, the initial image will then be set to read-only. Once the image has been set to read-only, cryptographic authentication code will validate the digital signature that is required for all code images. Only once the code's digital signature has been validated will the permissions for the code image be set to execute-only, at the proper privilege level.

10. Systematically Secure Read-Only and Read-Write Data Areas.

Data areas and software stacks at no time will have execute permission. They will be set to write permission when being initialized, and then to read-only or to read-write permission as specified by the application. These permissions will be fully operative only when the corresponding protection ID does not disable the one or more of them. Thus, a data area may be read-write for some sections of code, and, at the same time, read-only for different sections of code. Separate software stack pages will be employed for each privilege level.

11. Systematically Secure Software and Register Save Engine (RSE) Stacks.

Software stacks are secured as described in the preceding principle. RSE stacks have read-write permission, but with these permissions limited to privilege level zero (PL0). Pages of the RSE stack are contiguously allocated for each privilege level; access to these pages is protected by using a distinct protection ID for each privilege level. Scanning for circumventing application register instructions at manufacturing time can eliminate any executable code that might circumvent this protection.

12. Reserve PL0 for Platform Mechanism Control Codes that Must Use Privileged Instructions.

The guiding principle for placing code for a system service at PL0, the highest hardware privilege level, therefore, is: Privileged instructions are essential for the service's correct function. Only such services, called "Platform Control Services" (PCSs), shall execute in a compartment at PL0. Code executing at PL0, is able to exert complete control over the hardware. There is no defense whatsoever against malice in PL0 code. It follows that such code must be minimized and known to be correct at the hardware instruction level.

13. Publish Critical Platform Control Source Code.

Correctness of and confidence in the platform control code, which executes at PL0, are essential. It is not sufficient simply to assert and advertise such correctness. In accordance with the guiding practices of the security and cryptography communities, critical platform control source code should be published openly for review and critique by experts. Confidence in the efficacy and correctness of the PL0 codes should be founded upon this peer review.

14. Cryptographically Authenticate Platform Control Service Calls.

In traditional systems, executing at PL0 constitutes authorization for executing the privileged instructions of the processor. In embodiments of a $CE^2$, services requiring privileged instructions are compartmentalized at PL0, and platform control functions are accomplished by making calls to these platform control services. Because PCSs do control the physical platform, PCS calls from code images operating at lower levels of privilege must themselves be authorized and authenticated.

15. Defense in Depth.

Where possible, establish multiple levels of protection, to guard against unanticipated vulnerabilities. This should be done even where one level of protection seems sufficient. For example, the privileges and systematic protection of code images imply that only correct code images ever would call a hardware control service that executes at the most privileged level of the system. Nevertheless, calls to platform control services always authenticate the point of call.

16. Minimize/Simplify System Administration and Operation Tasks.

Systems administration, operation complexity, and total cost of ownership (TCO) for current systems, particularly when one must engage in a monthly, weekly, or even daily patch race to stay ahead of security vulnerabilities, are excessive. In a preferred embodiment, a $CE^2$ design permits installation, configuration, self-test, and operation in less than 30 minutes. Administration may be performed via a network interface in a different computer. Operator graphical user interfaces (GUIs) must permit easily understood inspection and modification of configuration parameters, and continuous monitoring of system load and performance.

17. Cryptographically Authenticate System Administrators and Operators.

The interface from a systems administrator or operator will be secured by cryptographic authentication. Two- or three-factor identity authentication, conducted over an SSL connection may be employed. A separate token-pair or token-triple may be required to furnish root keys and initial random number seed data to the system. Permit a $CE^2$ to boot from a CD-ROM or DVD-ROM, possibly with cryptographic protections for both integrity and confidentiality.

18. Design for Recoverability

Provide services within a $CE^2$ that enable an application, in the event of a system error, readily to determine the cause of the event, to log the occurrence of the event, to restore a operational state, and to resume processing or restart itself. A simple reset-and-restart system service should be provided.

An exemplary computer system 100, representing an exemplary server, such as a 2-way HP Server rx1600, a 4-way HP Server rx5670, an HP Server rx2600, or the like, with which various features of the present invention may be utilized, will now be described with reference to FIG. 1. In this simplified example, the computer system 100 comprises a bus 130 or other communication means for communicating data and control information, and one or more processors 105, such as Intel® Itanium® or Itanium 2 processors, coupled with bus 130.

Computer system 100 further comprises a random access memory (RAM) or other dynamic storage device (referred to as main memory 115), coupled to bus 130 for storing information and instructions to be executed by processor(s) 105. Main memory 115 also may be used for storing temporary variables or other intermediate information during execution of instructions by processor(s) 115. According to various embodiments of the present invention, main memory 115 may be partitioned via a region-identifier-based memory partitioning mechanism. The resulting partitions may be assigned to one or more processors for exclusive access by such processors using a hardware-based isolation mechanism, such as associating areas of memory with protection keys.

Computer system 100 also comprises a read only memory (ROM) 120 and/or other static storage device coupled to bus 130 for storing static information, such as cryptographic digital signatures associated with initial code and data images of one or more CE2s, customized applications, and operating system, and instructions for processor(s) 105.

A mass storage device 125, such as a magnetic disk or optical disc and its corresponding drive, may also be coupled to bus 130 for storing information and instructions, such as an operating system loader, an operating system, one or more customized applications and associated $CE^2$s, initialization files, etc.

One or more communication ports 110 may also be coupled to bus 130 for supporting network connections and communication of information to/from the computer system 100 by way of a Local Area Network (LAN), Wide Area Network (WAN), the Internet, or the public switched telephone network (PSTN), for example. The communication ports 110 may include various combinations of well-known interfaces, such as one or more modems to provide dial up capability, one or more 10/100 Ethernet ports, one or more Gigabit Ethernet ports (fiber and/or copper), one or more network protocol offload boards, or other well-known network interfaces commonly used in internetwork environments. In any event, in this manner, the computer system 100 may be coupled to a number of other network devices, clients, and/or servers via a conventional network infrastructure, such as an enterprise's Intranet and/or the Internet, for example.

Optionally, operator and administrative interfaces 135, such as a display, keyboard, and a cursor control device, may also be coupled to bus 130 to support direct operator interaction with computer system 100. Other operator and administrative interfaces can be provided through network connections connected through communication ports 110.

Finally, removable storage media 140, such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 130 via corresponding drives, ports or slots.

Addressing and Memory Management

The discussion in this and the following major sections are illustrative of an Itanium 2 embodiment of the present invention. Embodiments of the present invention are illustrated by way of example, and not by way of limitation.

FIG. 4A conceptually illustrates the organization of physically addressed sections of code or data by a first generation general-purpose operating system, such as the DOS operating system for the IBM System/360. Sections 410-450 were placed contiguously in physical memory 400.

FIG. 4B conceptually illustrates the organization of virtually addressed sections 410-450 of code or data, and their mappings (as illustrated by the arrows) to physical pages 408, by traditional general-purpose operating systems, such as the ULW systems. Normally, operating systems, for nearly all pages, select a relatively small, fixed page size (illustrated by dotted-lines 460), often 4 KB (4096 bytes) or 8 KB (8192 bytes), and cover larger virtually addressed sections of code or data by using many such contiguously addressed pages 410-450. Each of the pages 410-450 may be mapped to any one of the physical pages 408 (P0-P11). Traditional operating systems also may employ a smaller number of much larger pages for specific purposes, such as mapping an entire section of an operating system or a display buffer.

Figure 5A:
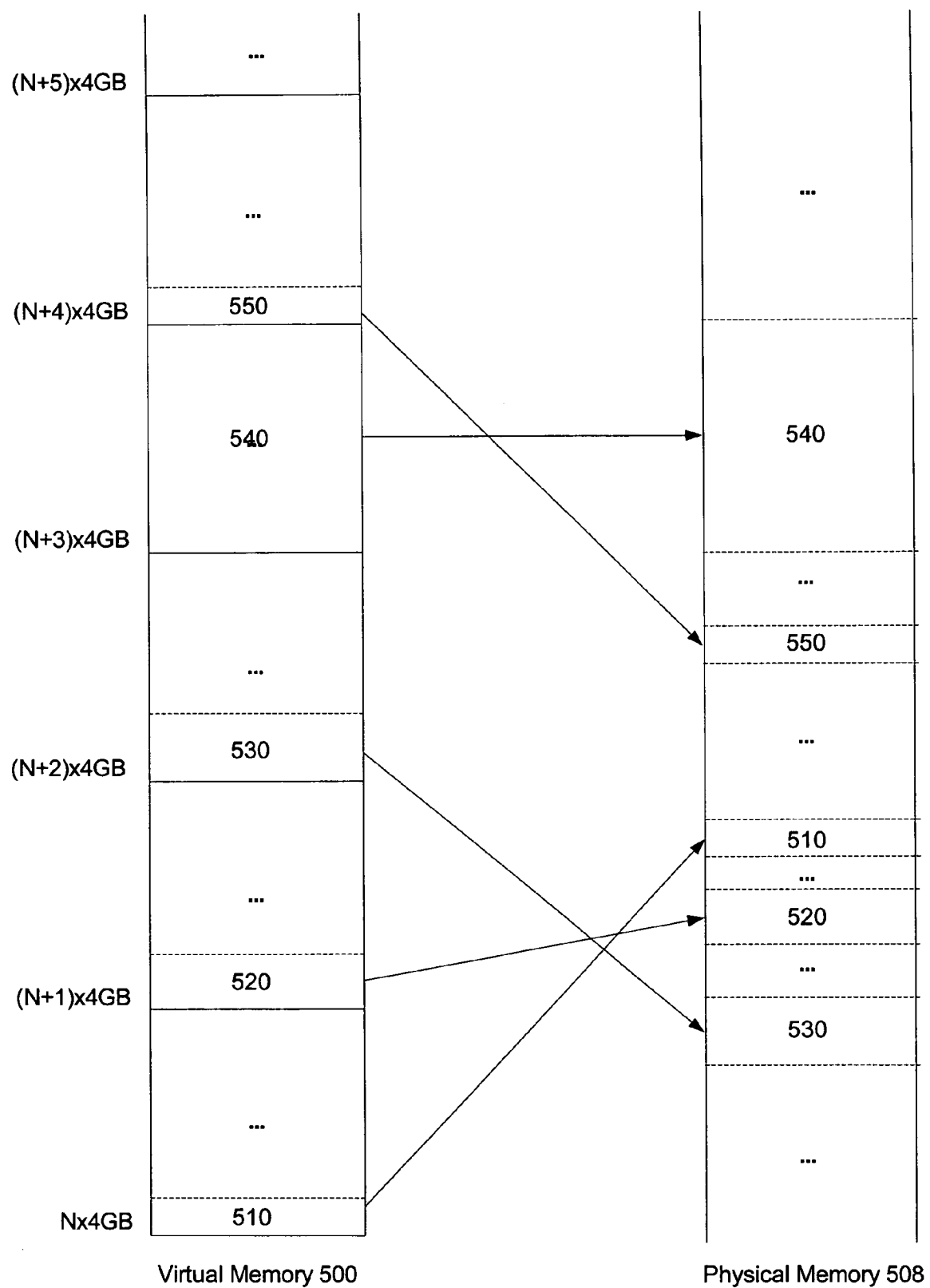
FIG. 5A conceptually illustrates the mapping of virtually and physically addressed pages in an Itanium embodiment of the present invention.

In one Itanium embodiment of the present invention, a $CE^2$ operates entirely in virtual addressing mode. However, the use of pages as illustrated in FIGS. 5A and 5B is quite different from that employed by traditional general-purpose operating systems.

In a preferred embodiment of the present invention using Itanium 2 processors, the virtual address translation parameters for each page also are specified by the Itanium architecture to include two types of memory access protection. The first access protection is called "Page Access Rights" (AR), encoded by a three-bit access type field and a two-bit page privilege level field as shown in the access rights table 300 in FIG. 3A. These fields limit permissible memory accesses to the page to defined subsets of read, write, and execute actions at particular privilege levels 330. The second access protection is called a "Protection Key" (PK). A protection key is 24 bits in length in an Itanium 2 processor, providing 16,777,216 distinct key values. When a PK is associated with a page, a memory access to the page is permitted only when a matching PK value is contained within one of the set of Protection Key Registers (PKRs) 350 as illustrated in FIG. 3B. Values in the PKRs 350 can be set only by code operating at the highest privilege level (PL0) of the processor. The values in the PKRs 350 include a protection key 360, three bits 370, 372, and 374 which, when set, disable all execute, read, and write accesses respectively to the page, and a valid bit 380. ARs and PKs, together with processor privilege level (PL) can be used to enforce fine-grained access control to all pages in memory. Thus, pages can be grouped into compartments, each identified and protected by a distinct PK value, in which execute-only, read-only, and write-only accesses can be controlled in any combination for each page.

State of the art hardware utilizes "Translation Lookaside Buffers" (TLBs) to accelerate accesses to virtually addressed memory. A TLB contains a page's virtual and physical page addresses, and all associated translation parameters such as ARs and PKs. If the processor hardware accesses a virtual address that is not then contained in a TLB, a "TLB miss" occurs, and hardware and/or software must (1) find the translation for that virtual address from a set of tables in memory that specify virtual-to-physical translations; (2) insert the needed translation into a TLB; and (3) re-execute the memory reference instruction. For Itanium embodiments of the present invention the miss sometimes can be handled entirely by hardware, and, at other times, a software exception occurs requiring software to resolve the TLB miss. Because TLBs are complex and highly optimized hardware, modern processors have only a limited number of TLBs—perhaps ~100 for instruction virtual addressed page translations and ~100 for data virtual addressed page translations. For systems using 4 KB or 8 KB pages, this limited number of TLBs restricts the memory that can be addressed without a TLB miss to ~400 KB or ~800 KB respectively. For physical memories reaching a few gigabytes in size, and on-chip caches reaching 3, 6, 9, or more megabytes, TLB misses can be expected to occur frequently.

For the Itanium embodiment of the present invention, the $CE^2$ pages are organized as follows, and TLB misses can be eliminated entirely. The Itanium 2 processor implements 11 page sizes: 4 KB, 8 KB, 16 KB, 64 KB, 256 KB, 1 MB, 4 MB, 16 MB, 256 MB, 1 GB, and 4 GB. Once the physical memory map is determined, according to one embodiment, the physical memory is organized into lists of the largest possible page size, using only the nine page sizes of 16 KB or larger. The largest possible pages are allocated for application BSS working storage. This storage is set to zero when the $CE^2$ is initialized. Some 16 KB pages normally are allocated for sections of software and Intel Architecture-64 (IA-64) "Register Save Engine" (RSE) stacks, unless larger pages are required by a particular $CE^2$ application. Finally, single or up to three pages are allocated to contain each of the system and application code and data sections comprised by the $CE^2$.

FIG. 5B is an excerpt illustrating an actual organization of physical pages according to one Itanium embodiment of the present invention. The physical page organizations for three separate contiguous ranges of physical addresses are shown in 570-590. Each line shows the physical address and size of the organization that results in the largest possible pages. The physical page addresses are hexadecimal numbers. If during allocation of physical pages for code and data sections a particular page size in the page lists is exhausted, the next larger page is partitioned into four pages of the next smaller size, recursively if needed. Each page is assigned the desired AR and PK values, resulting in a set of compartments, in each of which may be executable code pages and/or data pages. This minimizes the number of pages required, and provides fine-grained access control to each compartment and page. Early results show that about half the available number of Itanium 2 TLBs may cover an entire $CE^2$. Thus, in many $CE^2$s TLB miss processing overhead can be entirely eliminated. Managing pages in this manner may require the $CE^2$ software to deal with some TLB misses. The Itanium processor hardware that resolves TLB misses deals only with uniform page sizes in each region of memory.

FIG. 5A conceptually illustrates the mapping of virtually and physically addressed pages in an Itanium embodiment of the present invention. Except for the cases where contiguous virtual addresses are required between particular pages, such as software stack pages, where each contiguous page must have a different access privilege level, each page is assigned a virtual address that begins on a large aligned boundary, such as one-gigabyte or four-gigabytes. (Within the 85-bit virtual address provided by the Itanium processors, there are more than sufficient virtual addresses to permit this sparse virtual address assignment.) This is illustrated in FIG. 5A for four-gigabyte virtual address alignments. A four-gigabyte alignment permits any of the eleven page sizes supported by the Itanium 2 processor to be mapped to any such virtual address boundary. It also means that one cannot in a loop address beyond the boundaries of a page smaller than 4 GB without causing an addressing exception.

In the example illustrated in FIG. 5A, virtually addressed pages 510-550 each begin at a four-gigabyte boundary and extend to the corresponding dashed line. In the case of Page 540, a 4 GB page beginning at virtual address (N+3)×4 GB, there is no dashed line. Virtually addressed pages 510-550 are mapped to physically addressed pages 510-550 within physical memory 508. Each virtual page is mapped to a physical page of exactly the same size as shown by the arrows.

In traditional general-purpose operating systems, virtual memories a few times larger than the platform physical memory are provided. This means that TLB misses sometimes will cascade into page faults. When the TLB miss hardware and/or software discovers that the required translation is for a page that has been copied out to disk, the software must (1) find an available physical page, by copying out still another physical page if necessary; (2) read the copied out page back into physical memory; (3) once the page is back in physical memory install the translation into both the mapping tables and a TLB; and (4) return control to the faulting memory instruction. Occasionally in engineering a quantitative change can be so large that a qualitative change results. For physical memories, the presently available sizes are so big that providing a 2× or larger virtual memory for a $CE^2$ is no longer required. This is another departure from the structure of a general-purpose operating system.

Itanium system software conventions define two types of stacks. The first may be referred to as a "Software Stack"; the second is called an "RSE Stack". Within a $CE^2$, unlike a general-purpose operating system, there is no need to support stacks that are sufficiently extensible to support arbitrary recursive processes. Accordingly, SWSs and RSESs of sufficient size for the $CE^2$ application are allocated and protected by ARs and PKs as described below. Addressing beyond any prescribed boundary results in error notification to the application, which then is provided the means to take recovery action and resume processing.

Figure 6A:
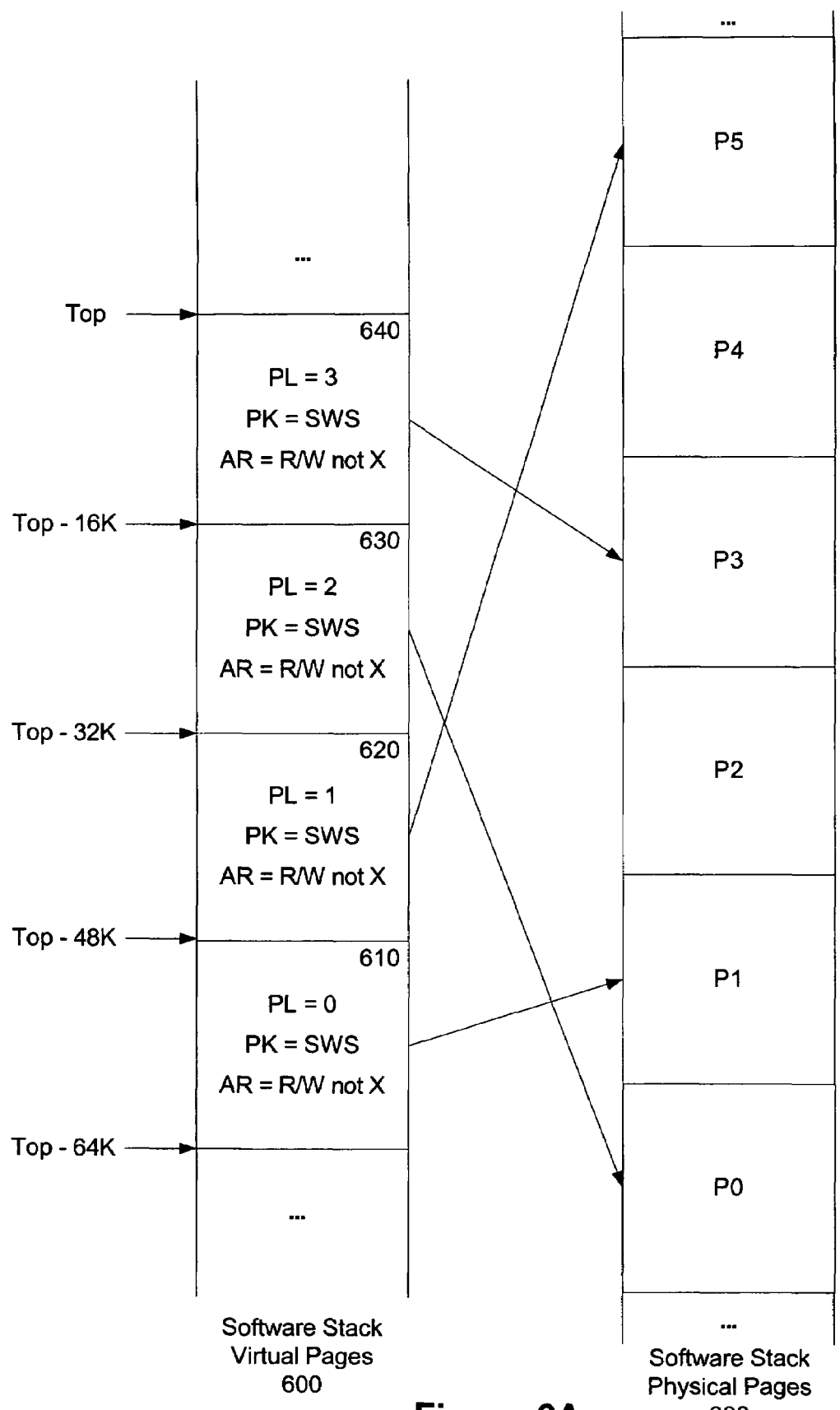
FIGS. 6A and 6B are simplified diagrams of the pages, with associated protection settings, allocated for software stacks and Register Save Engine stacks in an Itanium embodiment of the present invention.
Figure 6B:
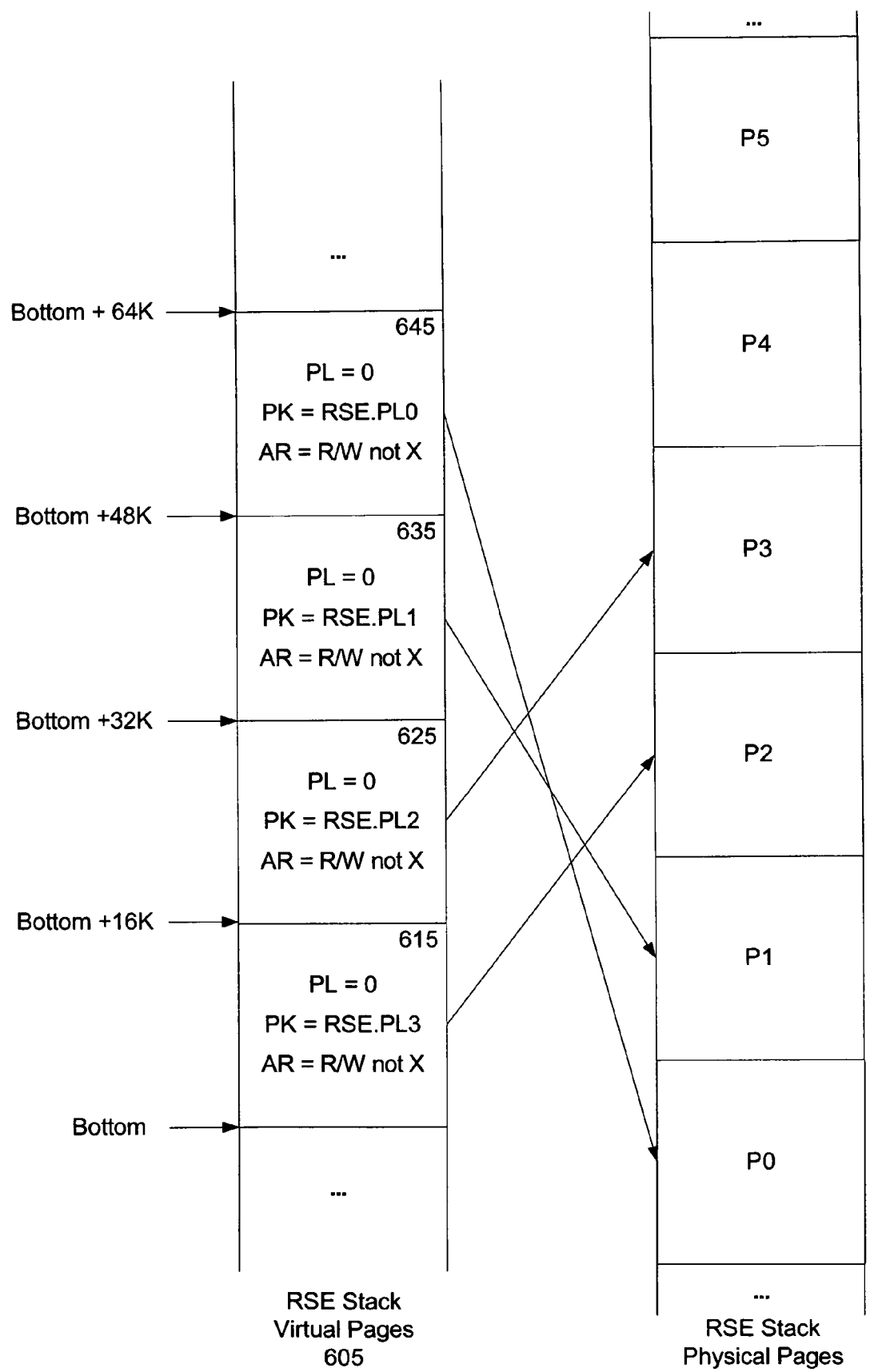

FIGS. 6A and 6B are simplified diagrams of the pages, with associated protection settings, allocated for SWSs and RSESs in an Itanium embodiment of the present invention. SWS virtual addresses 600 grow from the top of the stack, at the highest virtual address toward lower virtual addresses. The SWS in the present example comprises a set of pages 610-640 suitably sized for the requirements of the particular application or set of particular applications that execute within a particular $CE^2$. In this particular example, these 16 KB pages 610-640 are assigned contiguous virtual addresses shown by the arrows pointing to pages 610-640. While in the present example, each privilege section 610, 620, 630 and 640 of the SWS requires only a single page, in other cases, each privilege section may include up to 3 virtually addressed pages[4]. All privilege sections 610-640 have read-write, but never execute, access rights at their respective hardware privilege levels, PL3 for 640, PL2 for 630, PL1 for 620 and PL0 for 610. If stacked data is to be obscured from the application, the SWS address may be pushed to that of a higher privilege section before control flow passes to higher privilege level code. FIG. 6A also illustrates the mappings of the virtually addressed SWS pages 600 (610-640) to physical pages 608 (P0-P5) as shown by the arrows.

[4] One to three smaller pages may be used before selecting the next larger page size, which usually is four times larger.

As illustrated in FIG. 6B, RSESs grow from low virtual addresses to higher virtual addresses. In this example, an RSE stack comprises a set of pages 615-645 sized suitably for the requirements of a particular application or set of applications that execute within a particular $CE^2$. In this particular example, these 16 KB pages 615-645 are assigned contiguous virtual addresses shown by the arrows pointing to pages 615-645. The required privilege level is set to PL0 for all RSE privilege sections 615-645. All RSE privilege sections 615-645 have read-write, but never execute, access rights at PL0. In one embodiment, the privilege level for accessing RSE stack pages 605 is a separate privilege level from that of executing code. This is discussed in more detail below. While in the present example, each privilege section 615, 625, 635 and 645 of the RSE stack requires only a single page, in other cases, each privilege section may include up to 3 virtually addressed pages.

Access to the more privileged pages of the RSE is controlled by assigning distinct protection key values to each privilege level. When control flow crosses hardware privilege boundaries, the contents of the PKRs are modified to restrict RSES page accesses only to authorized privilege levels. Specifically, the lowest virtually addressed privilege section 615 will be protected by a PK present in a PKR for all privilege levels. The next higher virtually addressed privilege section 625 is protected by a PK present in a PKR only for code operating at PL2, PL1, or PL0. The subsequently higher virtually addressed privilege section 635 is protected by a PK present in a PKR only for code operating at PL1 or PL0. The highest virtually addressed privilege section 645 is protected by a PK present in a PKR only for PL0. All PKs disable execute privilege. FIG. 6B also illustrates the mappings of the virtually addressed RSE pages 605 (615-645) to physical pages 618 (P0-P5) as shown by the arrows.

This design eliminates the need to swap RSE stacks when crossing privilege levels. However, to avoid leaking confidential values, the system code may be designed to clean registers containing sensitive values prior to returning to less privileged code. For Itanium processors, up to six registers can be cleared in a single cycle. Normally, by employing otherwise unused instruction slots register clearing can be accomplished without requiring more than a few extra cycles.

Depending upon the interruption structure required by a particular application, a separate SWS and/or RSES may be allocated for interruption control flow within the system. Alternatively, and more simply, if interruption control flow can be deferred until control returns to an appropriate privilege level, no separate SWS or RSE stack may be required. In this case, interruption code at a lower privilege level may be invoked as a system injected call at the lower privilege level, prior to returning normal control to the lower privilege level. In this manner, the single SWS and RSES can be used both for normal and for interruption processing.

As mentioned above, the privilege level for access to RSE stack pages is contained in a separate Itanium application register named the "Register Stack Configuration Register" (AR.RSC), and the virtual address to which the next register engine store will take place is contained in an Itanium application register named the "RSE Backing Store Pointer for Memory Stores" (AR.BSPSTORE). Unfortunately, the instructions to modify the AR.RSC and AR.BSPSTORE application registers can be executed at PL3, the lowest hardware privilege. However, if the AR.RSC mode field is set non-zero, any attempt to modify the AR.BSPSTORE register generates a detectable hardware exception. Any modification of the AR.RSC register to alter the mode field results in the privilege level field being reduced in privilege from PL0 to the current hardware privilege level, PL3 for the application. Except for PL0 code, altering the AR.RSC register would make the RSE contents completely inaccessible, because memory access to the RSE pages requires that PL0 be set in the AR.RSC.pl field. According to one embodiment of the present invention, the protection strategy adopted for a $CE^2$ is to initialize the AR.RSC privilege level to PL0, and the AR.RSC mode field to 0×3. Because the $CE^2$ construction process has visibility to all executable code, the executable code will be scanned to assure the absence of any non-PL0 instructions that would modify the AR.RSC or AR.BSPSTORE registers. Strictly speaking, assuring no modification of the AR.RSC would suffice for protection, because any modification only of the AR.BSPSTORE would result in an exception. But the manufacturing policy for each $CE^2$ is to remove all possible sources for exceptions while the $CE^2$ is being constructed. This code scanning will be done at the same time cryptographic digital signatures are being computed for the executable code sections.

Memory allocation $CE^2$ services are provided to allocate and free working memory within the BSS data pages, uninitialized read-write data pages. BSS data pages are assigned contiguous virtual addresses. They are set to zero when the $CE^2$ is first loaded. The virtual address assignment strategy for pages permits the very largest pages to be used to compose the heap. For each $CE^2$ an allocation-unit size for allocating virtual memory within the heap is selected that is suitable for the application. This allocation-unit size may differ for each application. The service calls to allocate and free memory deal only with contiguous multiples of this defined allocation-unit size. The data structures controlling virtual memory allocation within the heap are maintained in an entirely separate page, and can be made very compact. In one test implementation of the Itanium embodiment of the present invention, the bookkeeping data structure for allocation of each allocation unit sized chunk of memory required only 2.5 bits. The isolated heap allocation control data structure cannot be contaminated by any stores in the application, and can be used to determine the exact memory allocation state in the event that an application finds it necessary to undertake recovery and resume measures.

Execution Control

This is a discussion illustrative of an Itanium embodiment of the present invention. As implied by the $CE^2$ first design principle, execution control also is limited to the simplest, fastest, and most secure capabilities. A $CE^2$ provides only a single thread for application execution on each processor. No other application scheduling or dispatching mechanism is provided. The single thread of execution on each processor persists as control on a particular processor flows back and forth among the application code and more privileged system service codes. This single thread also persists as control flow passes to exception handling routines, interrupt service routines, and deferred interrupt service routines within the application and system components.

Figure 10:
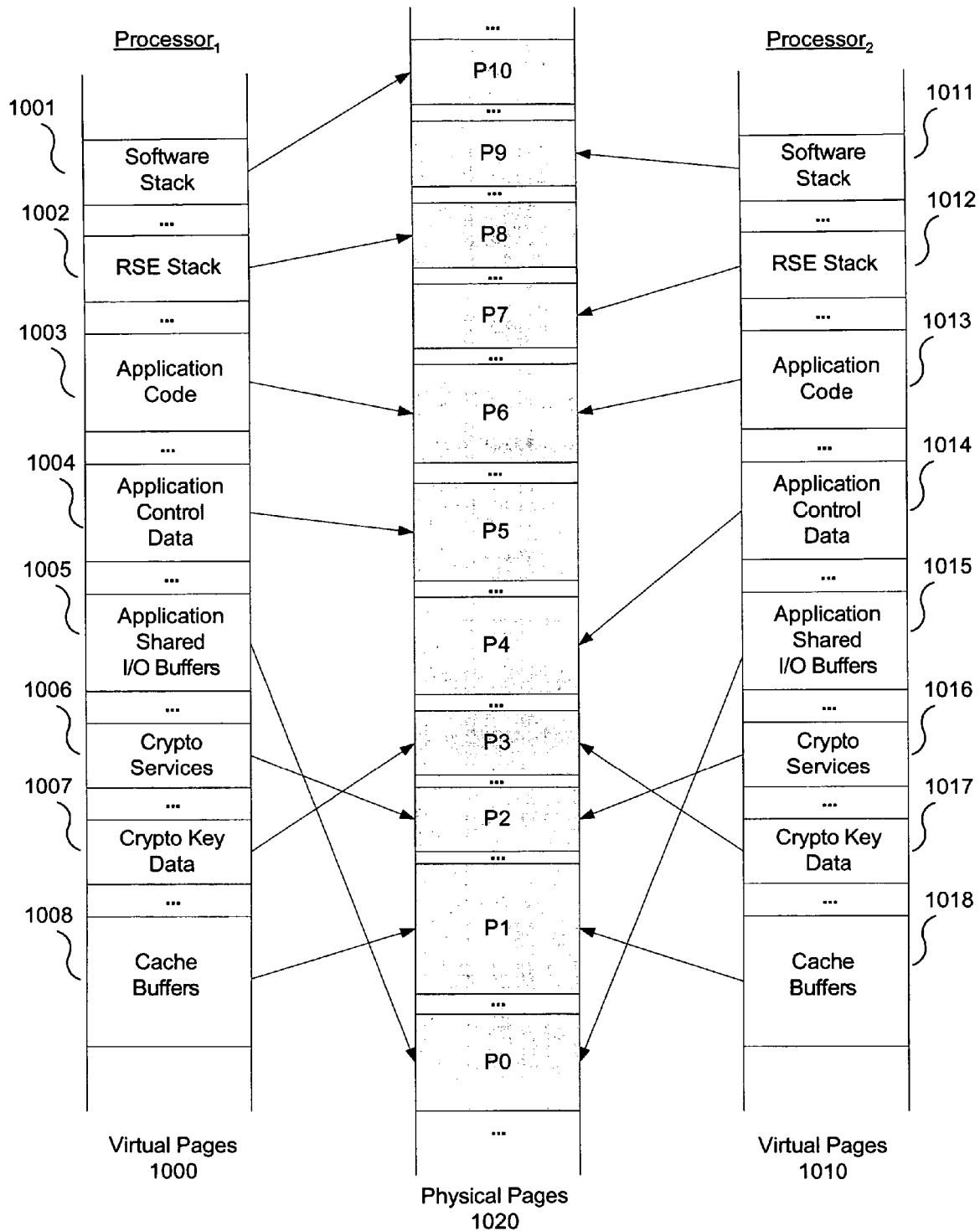
FIG. 10 is a diagram showing local and global mappings of virtually addressed resources in a multiprocessor embodiment of the present invention.
Figure 12A:
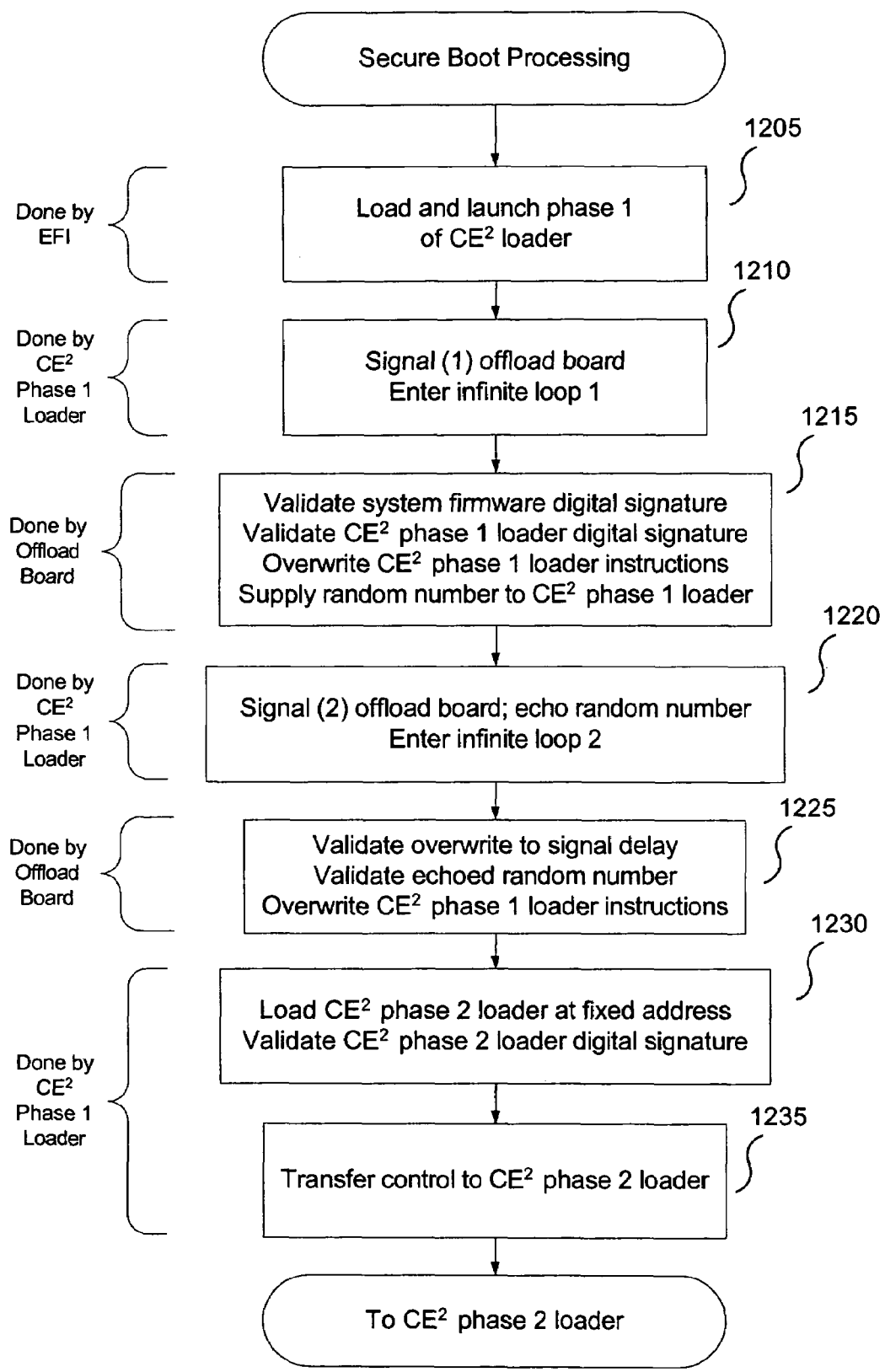
FIG. 12A is a flow diagram illustrating secure boot processing for an Itanium embodiment of the present invention.

The application component of a $CE^2$ is responsible for scheduling and controlling its work, whether executing on a single processor or executing on more than one processor. When multiple processors are employed by an application, the application itself is responsible for coordination and synchronization among these processors. Such synchronization may be accomplished by direct use of the atomic operations provided by the hardware (such as the Itanium exchange, compare-and-exchange, or fetch-and-add hardware instructions), or by a software-defined lock hierarchy implemented by employing the atomic instructions. The atomic instructions may occur in assembly language subroutines, or may be specified using compilers that permit in-line assembly language statements. As shown in FIG. 10, each processor may have its own software and RSE stacks 1001, 1002 and 1011, 1012. Memory addressability to each page can be local to a specific processor 1004 and 1014 or shared among all processors 1005, 1008 and 1015, 1018. Application code images also can be local to a specific processor or shared among all processors 1003 and 1013. System services code normally would be shared by all processors 1006, 1016. System service data also may be local or shared 1007, 1017. FIG. 12 also illustrates the mappings of virtual addresses in two processors 1000 and 1010 to physical pages 1020 (P0-P10).

Figure 8:
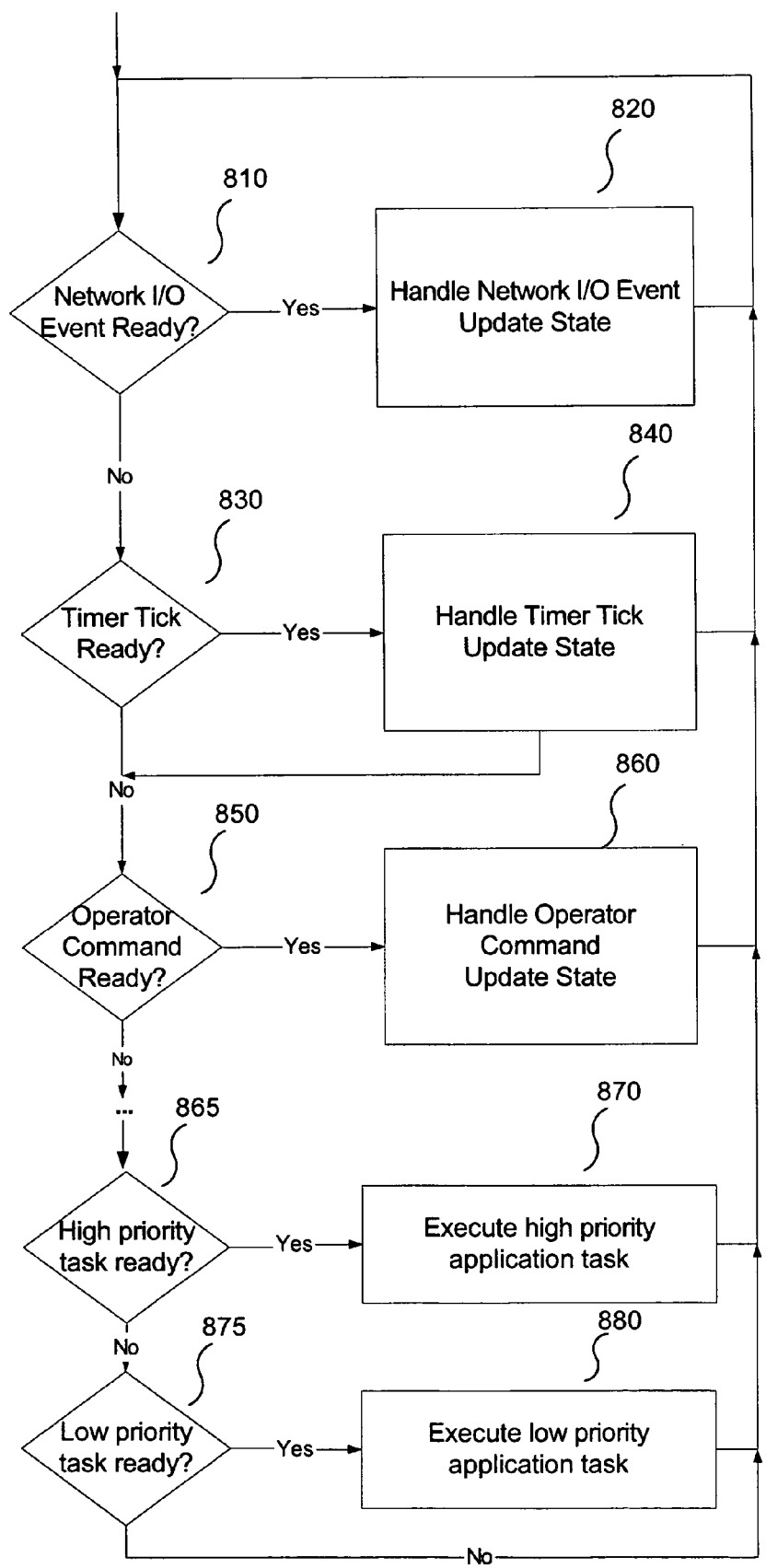
FIG. 8 is a simplified diagram conceptually illustrating application logic flow using a priority commutator, according to one embodiment of the present invention.

Use of well-known work scheduling constructs such as adaptive finite state machines, round-robin commutators, or priority-driven commutators, operating upon suitable work queues, enable an application driven by a single execution thread to organize its computational tasks and assure forward progress. FIG. 8 is a simplified diagram conceptually illustrating application logic flow using a priority commutator, according to one embodiment of the present invention. At decision block 810, a determination is made regarding the occurrence of a network I/O event. If a network I/O even has occurred, control flows to block 820 where the necessary processing required as a result of the network I/O event occurs. Once the state is set to show that such processing has completed, control from block 820 returns to decision block 810. It is for this reason that this control flow structure is referred to as a "priority" commutator. It causes the processing for the highest priority event, if present, to be performed first.

Once all network I/O events have been handled, at decision block 830, a determination is made regarding the occurrence of a timer tick. If a timer tick has occurred, control flows to block 840 where the necessary processing required as a result of the timer tick occurs. Once the state is set to show that such processing has completed, control from block 840 returns to decision block 810.

Once all timer tick events have been handled, at decision block 850, a determination is made regarding the issuance of an operator command. If an operator command has been issued, control flows to block 860 where the necessary processing required as a result of the command occurs. Once the state is set to show that such processing has completed, control from block 860 returns to decision block 810.

The above events are illustrative of a larger set of potential occurrences. The control flow logic illustrated by blocks 810-860 in the above examples may be continued for all such events that may occur for a particular $CE^2$. Once all higher priority events have been handled, the decision pattern continues for application tasks. In the present example, only two such tasks, called high priority and low priority are shown. An application normally would have many additional tasks.

At decision block 865, a determination is made regarding the presence of a high priority task on the application work queue. If such a task is present, control flows to block 870 where the necessary processing occurs. Once the state is set to show that such processing has completed, control from block 870 returns to decision block 810.

At decision block 875, a determination is made regarding the presence of a low priority task on the application work queue. If such a task is present, control flows to block 880 where the necessary processing occurs. Once the state is set to show that such processing has completed, control from block 880 again returns to decision block 810.

Single-thread control structures, such as the one illustrated in FIG. 8, permit an application to deal both with normal application tasks as well as tasks that occur as a result of events external to the application. Similar structures normally also may be employed at other privilege levels of the system. Such structures also enable an application to contain sections that are entered only as a result of the occurrence of exceptions or interrupts. Such interruptions include those that occur at regular elapsed time intervals of a system clock, those that occur as a result of completion or other signals resulting from one or more I/O operations, those that occur as a result of a system operator command, and those that occur as a result of a detected system error. In the first three of these cases, the application section is invoked soon after the occurrence of the interruption. When invoked, the application normally would set the minimal control state and status information needed to cause its work-scheduling algorithm, once the application resumed normal processing, to deal more fully with the consequences of the event. In the fourth case, the application normally would perform necessary recovery processing, calling upon any needed $CE^2$ system services, to restore a working application state, or possibly would invoke a reset-and-restart system service.

When a $CE^2$ application is linked with the required $CE^2$ system components, the application code image is prefixed by a $CE^2$ vector of instructions called an "Entry Vector" (EV). Each slot in the EV corresponds to a particular exception, interrupt, operator control signal, or other system event. The instructions in each position of the EV send control to the proper point in the application or system for handling the event. Each EV is tailored for a specific application. If, for example, an application section has been provided to respond to operator commands, the instructions in the corresponding EV entry would send control to that application section. One defined EV entry is used to begin execution of the application; another is provided to cause the application to terminate; others send control to application sections that must respond to exceptions and/or interrupts. If no application action is provided for a particular EV entry, a default system action may be taken.

Figure 7:
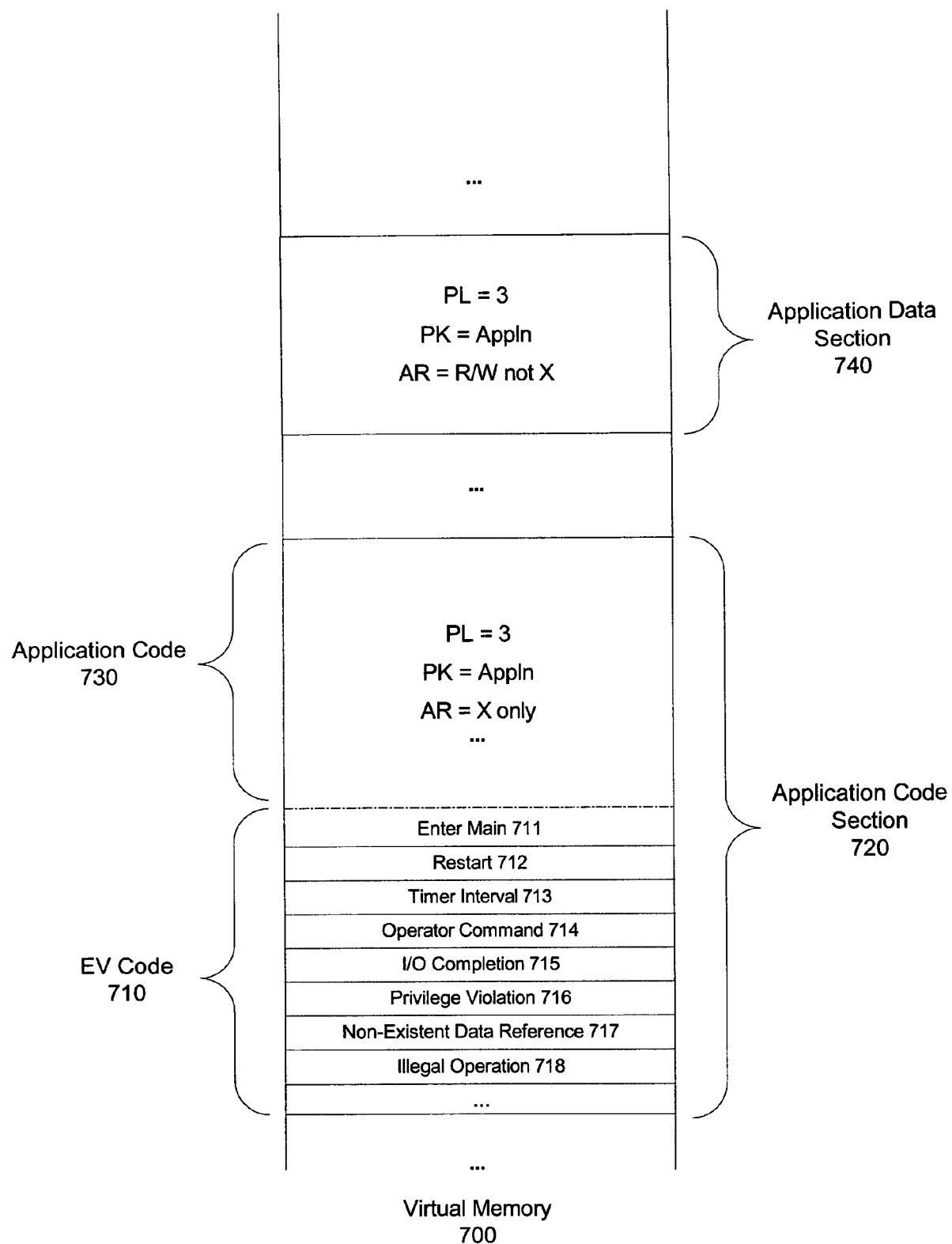
FIG. 7 is a simplified diagram of the entry vector associated with an application in an Itanium embodiment of the present invention.

FIG. 7 is a simplified diagram of an EV associated with an application in an Itanium embodiment of the present invention. The instructions comprised by the EV 710 are prefixed to the application code 730, and the complete application code section 720 is comprised by 710 and 730. Application data sections, such as application data section 740, occupy completely separate pages. The EV entries 711-718 in EV code 710 are intended solely to indicate the types of EV entries that may occur. They are shown in no particular order.

As an example of the EV function, if an application wishes to be notified of the elapsed time every five seconds, it first would call the $CE^2$ timer service specifying the five second interval and an identifying tag for the event; the instructions to send control to the application's code section for handling a timer tick already would be present in the EV. When a requested timer tick occurs, control will flow to the timer interval EV entry 713. This entry 713 would direct control to the specified application timer tick handling section. This timer tick handling section would identify the event, using the tag supplied when the application requested timer notifications, and update the application internal control state accordingly. When control returns from the timer tick handling section, the system then would return control to normal application processing, and control state set by the timer tick handling section then can influence the application execution flow appropriately.

In traditional general-purpose operating systems, applications can field signals that indicate some system and/or application malfunction, and attempt corrective action. This can be done through system calls that specify the specific signals to be caught, and the application code that is to be invoked when a corresponding signal occurs. Application recovery typically involves entering a process of unwinding the application control stack, one or multiple steps at a time, and executing required recovery code at some of these steps. Good practice is at some point to log the occurrence of the event. Ultimately, the application must be able to (1) correct its state and continue processing; or (2) re-launch a different copy of itself, passing sufficient information to enable the new copy to continue; or (3) give up and exit.

$CE^2$ applications normally would be designed to make every effort to recover and continue operation. In the worst possible case, applications would be designed to enter an operational state that would not propagate the failure to any other systems. For a caching proxy server, for example, if unable to restore normal cache processing, the server might fail to a pass-through mode that enabled web accesses to continue, albeit at a reduced throughput level; alternatively, the server might be designed to reset and restart itself.

$CE^2$ system services are designed to facilitate application recover-and-continue processing. In FIG. 7, EV entry 712 is provided to deliver a "must recover" entry to the application. The fundamental simplicity and understandability of the structure of an Itanium embodiment of a $CE^2$ is an advantage in designing application recover-and-continue strategies. The hardware protection principles assure that both application and system executable code sections have not been altered. The same is true of all read-only data sections. Memory page allocation is static; the nature and protection of each mapped page is precisely known. The software and RSE stack structures are well understood, and can be adjusted or reinitialized by simple system services. I/O operations critical to the application can be resynchronized with the application, and continued or restarted. The BSS memory allocation state always can be determined exactly when deciding whether to continue using the heap or to re-initialize it. No elaborate stack unwinding process is required. An application simply can record sufficient information to enable it to determine the course of action to take if it must recover and continue, or if it must reset and restart.

Figure 2:
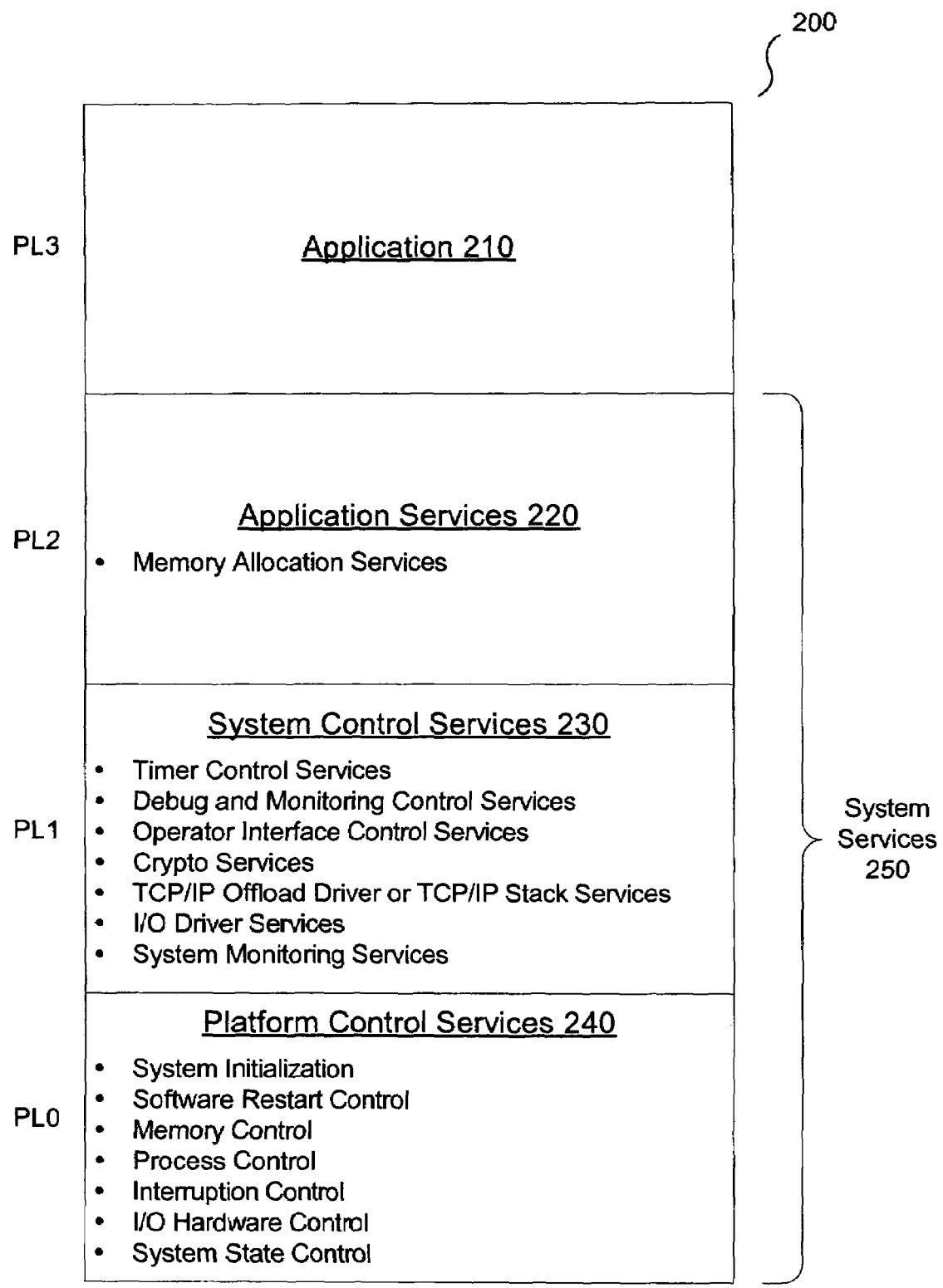
FIG. 2 conceptually illustrates the relationships among the services within a $CE^2$ according to one embodiment of the present invention.
Figure 12B:
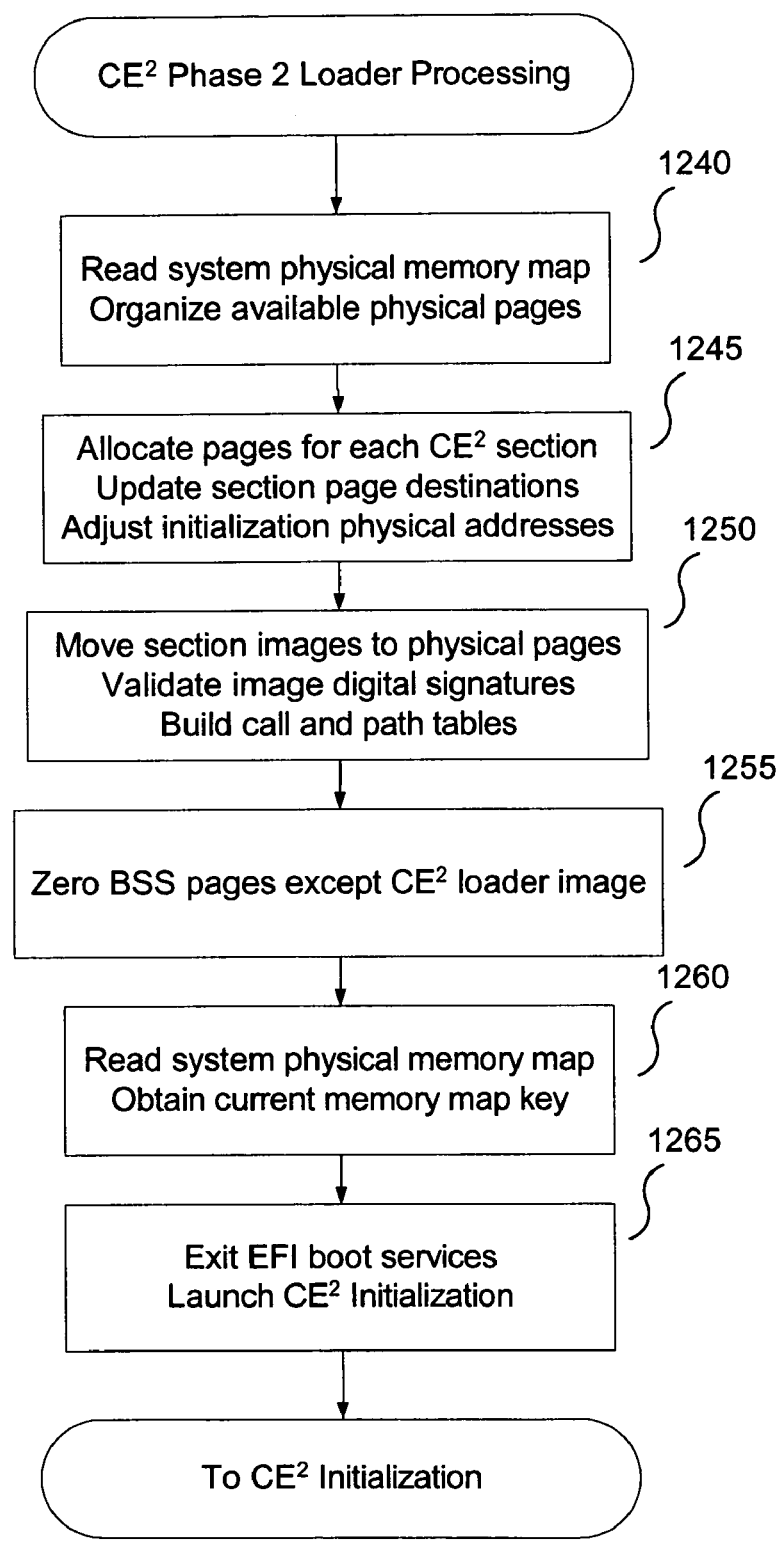
FIG. 12B is a flow diagram illustrating $CE^2$ phase 2 loader processing for an Itanium embodiment of the present invention.
Figure 12C:
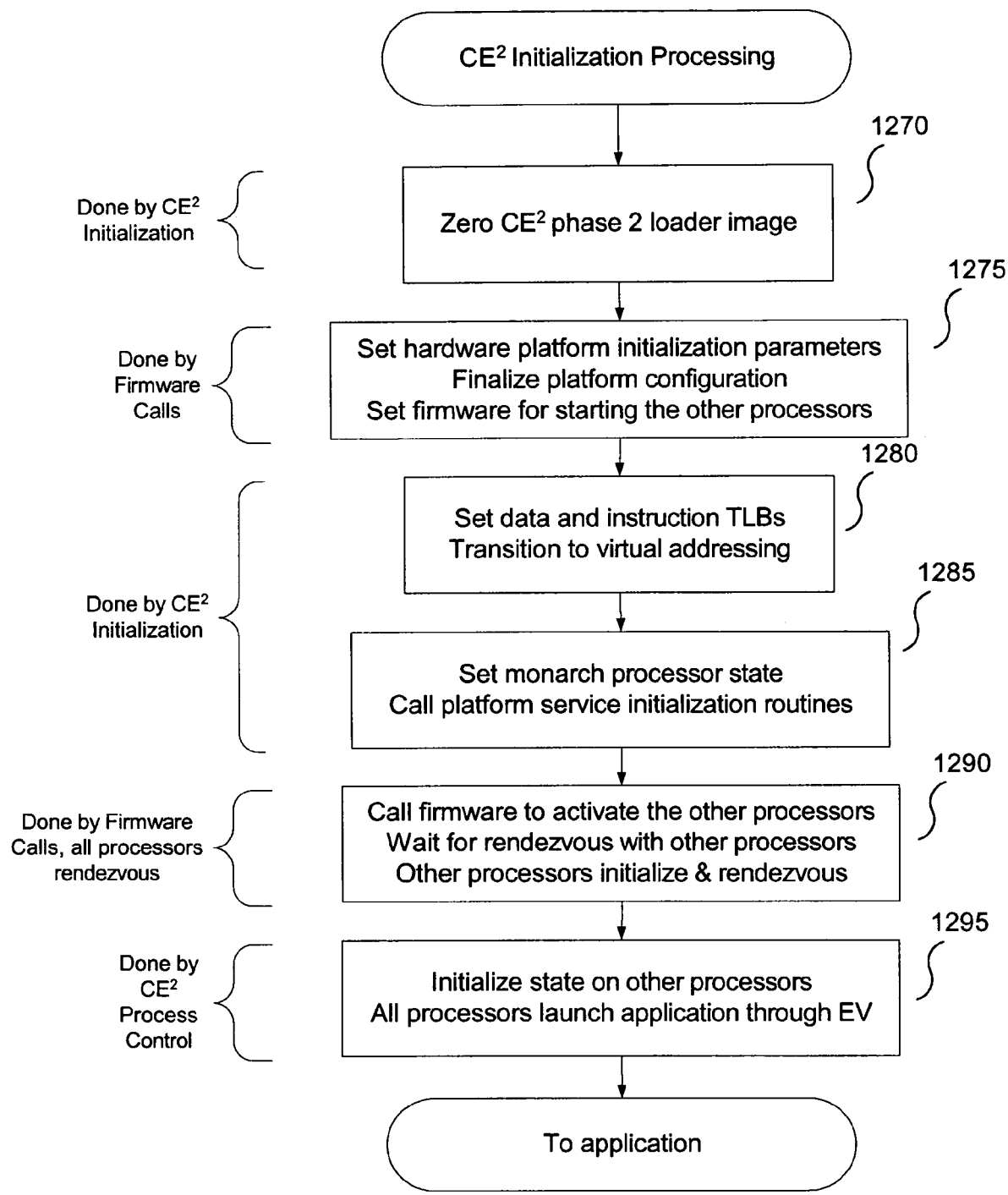
FIG. 12C is a flow diagram illustrating $CE^2$ initialization processing for an Itanium embodiment of the present invention.

FIG. 2 conceptually illustrates the relationships among the services within a $CE^2$ 200 according to one embodiment of the present invention. In Itanium embodiments of the present invention system control, like application control, is based upon the same, simple, single thread per processor. Execution of the application, including calls to system services 250, occurs on this thread. System services 250 include:

1. Platform Control Services 240. These services are the only services that execute at PL0, the highest processor privilege level. The use of one or more privileged hardware instructions is essential for the function of these services. Some of these services operate only at system initialization time; others are invoked when interruptions occur; and still others are callable. In this example, platform control services 240 comprise:

a. System initialization—FIGS. 12B and 12C are flow diagrams illustrating CE² loading and initialization for an Itanium embodiment of the present invention. Running in the monarch boot processor: allocates physical memory pages (1240); establishes virtual address mappings and page protection states for code, data, stack, and heap pages (1245); moves section images to the proper physical pages (1250); zeros heap pages (1255); reads the latest physical memory map key, exits EFI boot services, and transfers control to the CE² initialization services (1260 and 1265); zeros the physical page occupied by the CE² loader (1270); sets hardware platform and configuration options via firmware calls (1275); running in the monarch processor, establishes virtual address mapping and page protection states for code, data, stack, and heap pages; transitions to virtual addressing (1280); configures interruption steering to processors; calibrates timers using information supplied by the firmware; initializes I/O controllers, offload boards, or other plug-in boards; and wakes up any other processors (1285). Running in the non-monarch processors: establishes virtual address mapping and page protection states for code, data, stack, and heap pages; sets processor configuration and options via firmware calls; and calibrates timers using information supplied by the firmware (1290). Running on all processors: establish processor state; direct control to each system service initialization entry point, such as those to initialize any I/O adapters, any offload boards, and any other separate plug-in boards, externally acquire cryptographic keying and random state, send status messages to installation management systems; and finally pass control to the CE² application.

b. Software restart control—reports the restart event; temporarily disables interruptions, halts I/O operations and reinitializes any I/O adapters, any offload boards, and any other separate plug-in boards; reinitializes stacks; resets system state, with or without clearing heap memory; and restarts the application.

c. Memory control—handles TLB misses if all pages cannot simultaneously be covered by the available TLBs; manages protection IDs and access permission disables in protection key registers.

d. Process control—Running in each processor: initializes the state of the execution thread; activates the execution thread; checkpoints the execution thread; activates system deferred interruption service routines (DISRs); resumes the execution thread after an interruption; halts the execution thread; resets and/or restarts the execution thread; provides linkage services used when calling across privilege levels, returning across privilege levels, and when dispatching exception handling routines, interrupt service routines, and delayed interrupt service routines; authenticates calls.

e. Interruption control—Running in each processor: receives control when an interruption occurs; sets state to cause control to flow to corresponding exception handling routines, interrupt service routines (ISRs) and deferred interrupt service routines (DISRs); drains interruption queue, setting corresponding state for all pending interruptions.

f. I/O hardware control—issues all actual memory-mapped reads and writes to I/O controllers; translates all memory virtual addresses used by I/O drivers to correct physical addresses; translates I/O physical address back to virtual for use by I/O drivers. See the further discussion below.

g. System state control—reads and returns system state information to lower privileged system debugging services. No modification to system state via debuggers is permitted.

2. System Control Services 230. Except for I/O driver ISRs these services are invoked by calls from the application or from an application service. These services execute at PL1, the second highest hardware privilege level. According to the present example, system control services 230 comprise:

a. Timer control services—returns elapsed time signals to application via the application EV; manage multiple signal requests, returning each signal after the proper elapsed time. Each signal is tagged with an identifier that permits the application to correlate the signal with a particular timer event.

b. Debug and monitoring control services—returns system state and operational statistics; While operating, CE² system components each will maintain various measures of system activity. This system service returns a snapshot of these measures.

c. Operator interface control services—activated when operator requests are recognized; responds to requests asking for system status; initiates operator related EV actions when operator directives are received. It is envisioned that operator requests will be entered via a GUI on a browser that is maintaining an SSL session with the CE². This GUI will be capable of displaying system configuration settings and status. Operator directives may change the configuration settings, using interfaces such as "Apply" or "Save" buttons in a manner familiar to GUI users.

d. Crypto services—perform cryptographic services for the system and application; services include key generation and management, cryptographically strong random number generation; cryptographic hash functions, digital signatures, message authentication codes, and both symmetric and asymmetric cipher operations. Cryptographic keys and other random materials are maintained in compartments protected by protection keys reserved only for protecting these specific compartments; a particular key is specified by using a handle that was returned when the key first was generated.

e. TCP/IP offload driver or TCP/IP stack services—provides TCP/IP communications, either within one or more CE² processors or employing a TCP/IP offload board; In both cases, the interfaces to the application are at a generalized "socket" level that permits asynchronous operations and notification; data handling is based upon a "zero move" goal; when data movement cannot be avoided, it is combined with other processing, such as compression, decompression, enciphering, or deciphering.

f. I/O driver services—control the I/O adapters for the required system I/O; operate solely with virtual addresses; use platform I/O services for actual communication with I/O hardware; this prevents physical address attacks originating from an I/O driver.

g. System monitoring services—periodically update a display of system status, including metrics such as load, throughput, and hardware utilization information.

3. Application Services 220. These services operate at PL2, the second lowest hardware privilege level. Presently, there is only one defined application service. In the future it is envisioned that other application services might emerge at this level of the system. One possible future service, for example, would be a service that permits an application to surrender control of the processor thread to another background application until the occurrence of a specified event.

a. Memory allocation services—allocate and free memory from the application's heap memory; the size of the memory allocated always is a multiple of a fixed allocation unit, such as 4K bytes or 8K bytes or 16K bytes, etc. The allocation unit can be set for a particular application. The data structures used to keep track of the memory allocation can be made very compact. These data structures reside in totally separate memory and cannot be contaminated by wild memory stores within the application.

In accordance with the $CE^2$ design principles, system services 250 are limited to those essential for a particular application; and the services are implemented in the simplest, fastest, and most secure possible manner. I/O services are provided only for those devices required by the application. To those skilled in the art, it is evident that Itanium embodiments of the present invention would permit processor control to be generalized for simple preemptive or non-preemptive multitasking—among a fixed set of applications and provided by expanded application, system, and platform services. But unless and until a particular application finds it unavoidable to organize itself in that manner, a single thread of execution on each processor suffices.

Application calls to system services 250, and returns from system services 250, are executed in their entirety on the same single thread in each processor. In Itanium embodiments of the present invention, standard software calling conventions are employed. When a system service call transfers control to a service executing at a higher level of hardware privilege in an Itanium embodiment of the present invention, the privilege level crossing is accomplished by the use of "Enter Protected Code" (EPC) pages. As illustrated in FIG. 3A, the Itanium page access rights can be set to a TLB.ar 310 value of 7. When set to this value, branching to such a page can cause the current processor privilege level 330 to be raised (PL numerical level reduced) to the value set in the TLB.pl field 320 for the page. One or more EPC pages may be employed in one Itanium embodiment of the present invention to effect such privilege level transitions. A 32-byte aligned entry point is defined in this page for each service call that must execute at a higher hardware privilege level than that of the caller. Because of subtleties in the Itanium architecture definition, each defined entry point in the EPC page may consist of two bundles (each containing three instructions), separated by a cycle break. The hardware epc (enter protected code) instruction is effective only when executed within an EPC page and, when executed in such a page, raises the hardware privilege level as specified by the EPC page's TLB.pl field 320. The epc instruction must occupy the third instruction slot in the first bundle. The first and second instructions in this bundle must be able to execute at the old hardware privilege level. To prevent the possibility of erroneous calls to only the second bundle of a defined entry point, the second bundle must contain a branch to a non-EPC page in its third instruction position and in its first and/or second instruction positions have instructions that will cause an exception if the epc instruction in the first bundle had not previously executed. All other instructions in the EPC page should be set to cause a privilege exception. This practice assures that only correct privilege transitions can be made.

A hardware interruption may occur prior to execution of the first EPC page bundle of instructions, or between execution of the first and second EPC page bundles of instructions. This makes it impossible to determine solely from the hardware privilege level saved at the point of interruption whether the execution had fully transitioned to a full platform control service state. This, in turn, leads to uncertainty as to how to restore state when returning from an interruption. In a traditional kernel, for example, an interrupted privilege level of PL0 would not reliably indicate whether execution at the point of interruption still was using an application stack or had switched to a kernel stack. Similarly, in an Itanium embodiment of the present invention, an interrupted privilege level of PL0 would not reliably indicate the state needing to be restored to the protection key registers when returning from the interruption. This uncertainty is avoided by taking the following steps: (1) interruptions are disabled by executing an rsm (reset system mask) instruction in the second EPC page bundle; (2) the remainder of the transition to the higher privilege state occurs while interruptions remain disabled; (3) interruptions are re-enabled only after a flag indicating completion of the transition is set in a register accessible only to PL0 code; and (4) this flag is used to determine the state to be restored when returning from the interruption; the flag itself, of course, is modified to indicate the return state before the actual return.

When calling across privilege boundaries, the call first is directed to the proper entry point in an EPC page, as just described. The branch instruction in the second bundle at the entry point in the EPC page forwards control to linkage service platform control code. The linkage service code first sets any additional system state needed for the code operating at the higher hardware privilege level. Such modifications might include modifications to protection key registers, or supplying parameters to the designated platform control service. When calling a cryptographic function, for example, this would be the point at which a protection key register would be set to enable access to the cryptographic key data page(s). The higher privileged code is entered in such a manner that, upon return, control again passes through the linkage service code. For the cryptographic function example, this would be the point at which the protection key enabling access to the cryptographic key material would be invalidated. Linkage service also has the opportunity upon a return to direct control to code that must be invoked due to the occurrence of an interrupt, before returning back to the original caller. This mechanism is used to invoke DISR and other EV routines. For such actions linkage services: (1) preserves sufficient state to enable control later to return to the caller; (2) executes the call to the DISR or other EV routine; and (3) upon return from the DISR or EV routine, restores the saved system state and returns to the original caller.

Hardware interruptions generally fall into two distinct classes. The first, which may be referred to herein as "Exceptions," are those interruptions that occur as a result of executing a particular instruction. These interruptions occur synchronously with execution of the instruction causing the exception. The second, which may be referred to herein as "Interrupts" are those interruptions that may occur at an arbitrary point in time, usually as timer or I/O interruptions. Both types of interruptions are handled by the same hardware mechanism, but the software deals with the two classes of interruptions in quite different manners. For exceptions, the platform interruption and linkage services immediately direct control to an EV entry at the same hardware privilege level, or to other system code, first to deal with the exception and then to return. For interrupts the system first may have to invoke one or more ISRs, DISRs, and also will attempt to handle all other pending interrupts, including their associated ISRs and DISRs, before returning control to the point of interruption.

Handling exceptions is conceptually straightforward. Linkage service saves the system state needed later to return to the point of the exception. It then makes a call to the EV routine or other system exception handling code. Upon return from the exception handling code, linkage service restores state and returns to the point of exception. For interrupts, it is possible that at the point the interrupt occurred the system may have been executing at any of the hardware privilege levels. Interruption control services and linkage service then cooperate first to direct control to one or more interrupt service routines. ISRs execute while further interruptions remain disabled, and may be limited to executing only at some hardware privilege levels, such as PL1 and PL0. During ISR execution, ISRs normally set state to cause an associated deferred interruption service routine to execute later. ISRs execution is carried out using a different software stack and a different RSE stack. Control is switched to these stacks by the interrupt service routines, and the ISR routines are invoked. While executing, the ISR routines may call other system services, using a separate EPC page that may be called only by ISR routines. Once the ISR routines for a particular interrupt have been executed, the interrupt services look for another pending interrupt. If another interrupt is found, interrupt and linkage services proceed to execute the ISR routines for that new interrupt. Processing continues in this manner until all pending interrupts are processed. Once all ISR functions have been executed, the normal software and RSE stacks are restored, control returns through linkage service, and interruptions are re-enabled. Before finally returning to the actual point of interruption, linkage services first directs control to each of the DISR routines that have been activated by the state set by corresponding ISRs.

In the Itanium embodiments of the present invention, functions formerly executed by privileged instructions in the traditional ULW systems are performed by calls to platform control services. This opens the possibility that making such calls maliciously could attack the system. To preclude such attacks, a structure is provided to enable the system and application to designate the authorized calls to system services, and to authenticate the caller when such calls are executed. The structure is predicated upon the facts that (1) code images reside in execute-only pages; (2) all code images have been authenticated by a cryptographic digital signature; (3) the $CE^2$ loader itself also has been authenticated by a digital signature; (4) the $CE^2$ loader is able to scan all executable code in order to validate digital signatures and detect instructions that might compromise the RSE; (5) the $CE^2$ loader also is able to identify all calls to privileged services; and (6) the $CE^2$ loader can supply random information at load time to assist in the authentication.

To those skilled in the art it will be apparent that there are several means to effect such call validation for critical system and platform functions. In one Itanium embodiment of the present invention the following approach is adopted:

1. Macros are provided both to C programmers and to assembly language programmers to be used for making critical service calls. These macros generate a code skeleton with a recognizable pattern that can be detected by the $CE^2$ loader. The skeleton also permits identification of the particular critical service being called.

2. One defined service call has the function of simply registering that program control flow reached a particular point in a program. A parameter of this call is an integer denoting a nesting level. A second parameter of this call is a 64-bit random number that is generate by and written into an Itanium instruction by the $CE^2$ loader.

3. Another defined service call has the function of simply erasing an earlier program control flow registration entry. A parameter to this call may be a virtual pointer to the registration call whose registration is to be erased. Alternatively, this call may have only a nesting level parameter.

4. Other critical service calls have an integer parameter that will be used to identify the particular call. The loader will generate this integer parameter and insert it into the executable instructions, and will build a table of all service calls, with the entry for this particular call located at the entry identified by this integer. A second parameter is a virtual pointer to a back-dominating registration or function call. A back dominating call is a call that always will have executed earlier in the program flow that eventually reaches the present call. Conceptually, each service call identifies a back dominating call to assure that the flow of control reached the critical service call via a legitimate program path. A third parameter is another 64-bit random number generated by the loader and inserted into the machine instructions. A fourth parameter specifies the disposition of the back dominator registration.

The $CE^2$ loader will supply the required random numbers to the registration calls, and an identifying integer value to each critical service call. The loader then generates a table of authorized calls that will be used by the platform linkage services to authenticate the calls.

When a registration call occurs, the random number supplied by the loader will be written into a path identification table, at the nesting level specified by the registration call. When a de-registration call occurs the random number previously written in the path identification table, at the nesting level specified by the registration call, will be set to zero, indicating that no path is currently registered.

When a function call occurs, the integer identifier parameter will be used to access the call table generated by the loader. The call table entry will contain: (1) the virtual return address of the function call; (2) the random number registered by the specified back dominator call; (3) the nesting level in the path table specified for the back-dominating registration; (4) a second random number generated by the $CE^2$ loader; and (5) a parameter specifying the disposition of the back dominator registration entry. In an alternative embodiment, this parameter might be supplied with the call rather than being part of the call table.

Figure 9:
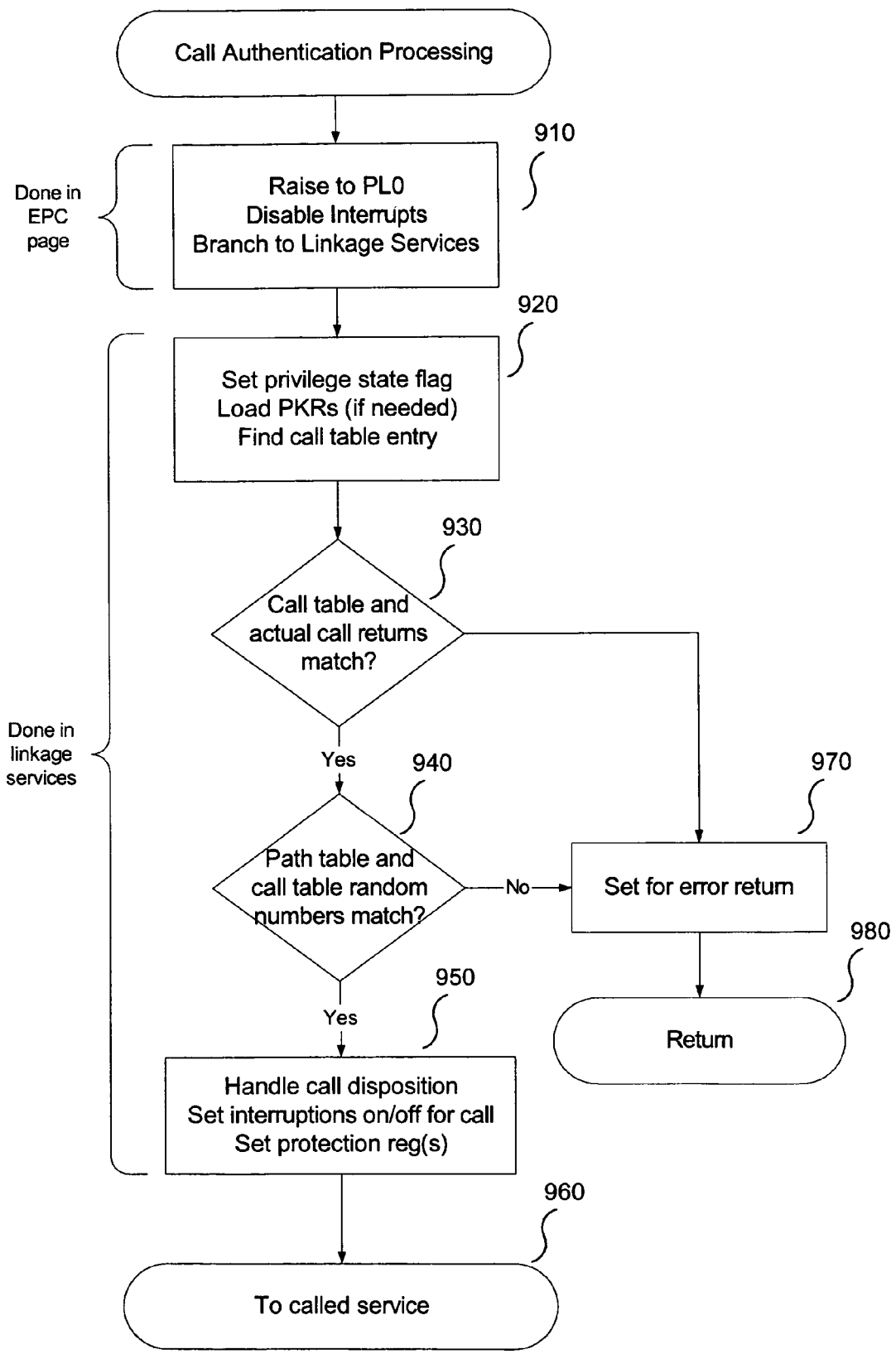
FIG. 9 is a flow diagram of call authentication as implemented in an Itanium embodiment of the present invention.

FIG. 9 is a flow diagram of call authentication as implemented in an Itanium embodiment of the present invention. According to this embodiment, authentication of a critical service call proceeds in the following steps:

1. The EPC processing described earlier occurs at block 910. This raises the hardware privilege level to PL0, disables interruptions, and transfers control to linkage services.

2. At block 920, linkage services sets the privilege state flag to indicate that processing has transitioned from the previous hardware privilege level. It then may set any PKRs required by the more privileged service being called.
3. The actual virtual return address is compared with the virtual return address from the call table at decision block 930. If the addresses differ, the authentication fails (970).
4. The random number from the call table entry is compared with the random number at the designated nesting level in the path table (940). If the numbers differ, the authentication fails (970).
5. If the authentication has failed, the platform linkage service generates an error event (980) that can be reported to the system or application. For this level of error severity, the application normally would enter a degraded operation state or execute a software reset-and-restart system service call.
6. Once the authentication has succeeded, the call table is modified as specified by the disposition parameter from the call table entry (950). Dispositions normally would include: no modification; delete the back dominator registration; replace the back dominator registration by the call table random number; insert the call table random number at the next nesting level in the path table; or other application-dependent dispositions. In general, dispositions can be tailored for each application. Once disposition processing has completed, control is directed to the called service (960).

I/O Logistics and Security

A guiding principle for the design of $CE^2$ I/O services is "zero move." This implies that I/O will whenever possible avoid the use of internal system buffers or of any intermediate buffer. If data moves are unavoidable, they if possible will be combined with other processing of the data—such as compression, decompression, encryption, or decryption. Embodiments of the present invention will employ $CE^2$ I/O services adhering to this basic principle.

A second guiding principle is that I/O services will be offered only for the types of I/O required by the particular application being supported by the $CE^2$. This is in contrast to the approach adopted by ULW systems—providing a structure able to accommodate a continuously growing population of I/O drivers and file systems to permit an application to utilize the operating system abstractions to execute I/O functions on any suitable I/O device. This is not to denigrate the principles employed by ULW systems. They are important and highly successful. It is simply to emphasize the fact that the objectives of maximum simplicity, fastest possible speed, and freedom from security vulnerabilities may lead one to different conclusions.

Particularly important cases when employing Itanium embodiments of the present invention for web applications are the data logistics for network I/O traffic. Packets may arrive in a wide variety of orders: some may signify the beginning of a new connection; others may contain the complete data payload of a request or response; still others may contain only a portion of a request or response; some payloads may require compression or decompression and encryption or decryption, as well as integrity validation; others may be intermediate packets used as elements of the formalities of a particular protocol; and still others may have been sent maliciously, with the intent force a system failure or to swamp a system and prevent it from performing its designated function.

Preferred Itanium embodiments of the present invention are expected to adopt one of two possible approaches for handling network traffic. The first approach is to provide the leanest network protocol stack and simplest possible drivers for the network interface controllers (NICs) built into or plugged into a particular hardware platform. These drivers may support extended and asynchronous extensions of "socket-like" protocols, and need not support any protocols beyond those essential for a particular application. The second approach is to employ one or more separate plug-in boards, such as a functional offload board, which may support higher level interfaces and employ additional processing cycles to deal with higher volume network loads, or a board designed solely to assist in securely booting. In both cases, the designs will be guided by the "zero move" principle.

Present principal general-purpose operating systems are significant vulnerable to security attacks from I/O drivers. In current ULW systems, I/O drivers execute at the highest hardware privilege mode of the system. There is no defense whatever against malice in one or more of these drivers. Because I/O drivers presently must work with physical addresses when instructing and communicating with I/O controllers, any protections provided by hardware virtual addressing mechanisms are readily circumvented.

Today's approach to this problem is to sign I/O drivers digitally in an attempt to attest that "good guys" wrote them and that their integrity has been preserved. Signed drivers can assure that they arrived for installation as written by their authors. But accepting that the authors are good guys remains a matter of blind trust. In effect, the system administrator is forced either fully to trust the owner of the digital signing key, or to decide not to install the driver on his or her system. It's neither a pretty nor a safe choice. The "trust the good guys because they digitally signed it" principle falls far short of a secure solution.

Unfortunately, the architectures of I/O controllers and of most proprietary-processor-based and industry-standard-processor-based platforms offer little help in devising a means to assure secure I/O drivers. The same protections offered for memory by virtual addressing are just as badly needed for I/O. As long as drivers must work with physical memory addresses, nothing in the main memories of hardware platforms can be protected from possible malice, or from bugs for that matter, in I/O driver codes. The Shamir and Van Someren paper cited earlier explained simple algorithms to find public and private cryptography keys while scanning physical memory.

Figure 11:
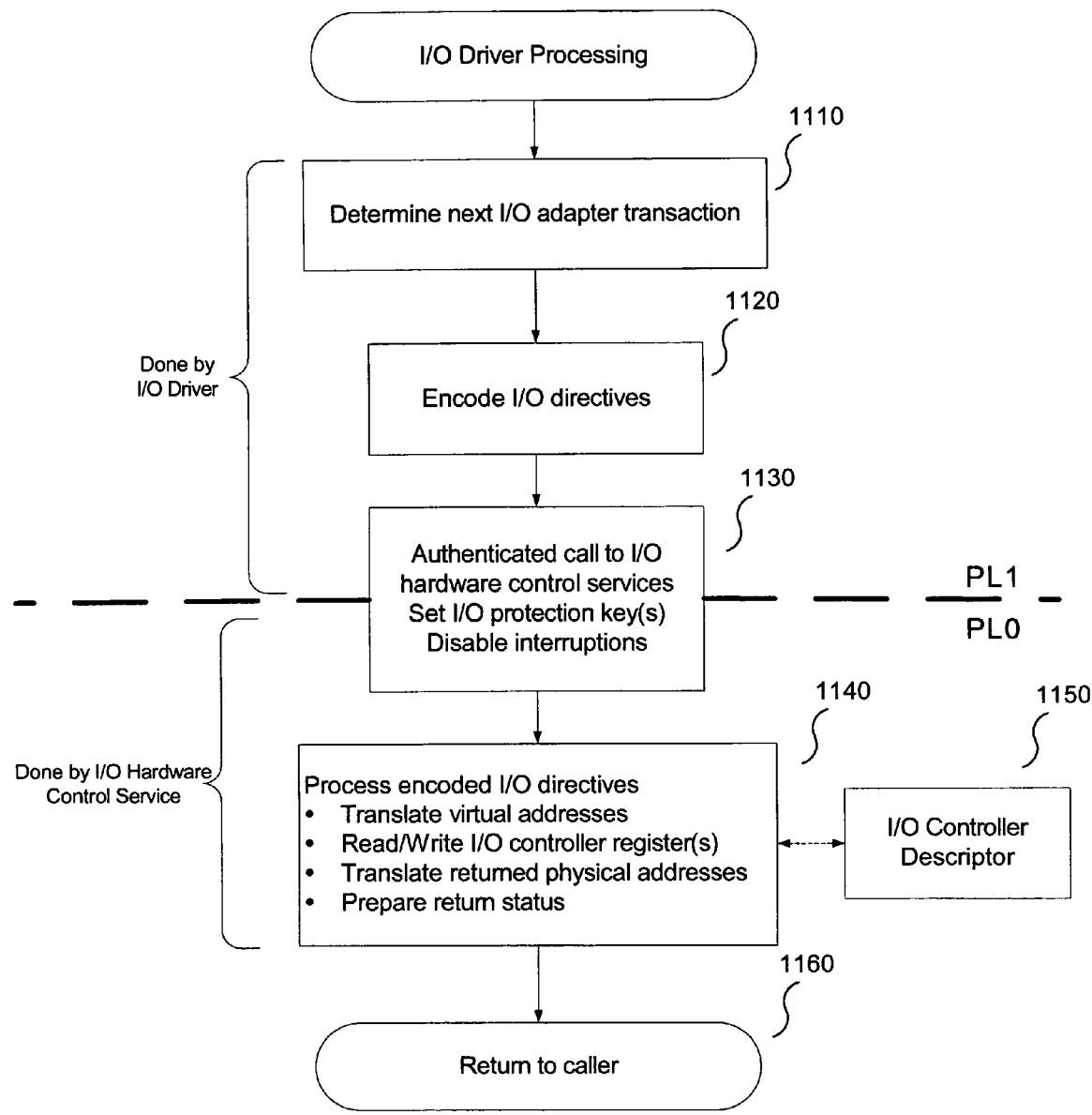
FIG. 11 is a flow diagram illustrating the software secure I/O hardware control service in an Itanium embodiment of the present invention.

FIG. 11 is a flow diagram illustrating the software secure I/O hardware control service in an Itanium embodiment of the present invention. The approach taken to secure I/O drivers in preferred Itanium embodiments of the present invention is to:
1. Have all drivers execute at PL1 as system control services;
2. Have all drivers work solely with virtual addresses;
3. Provide no addressability from PL1 to the virtual and physical addresses at which I/O adapters are mapped;
4. Perform all actual reads and writes to hardware I/O adapters only in a platform hardware I/O control service that is as small, simple, and understandable as possible (1140);
5. Perform all virtual-to-physical or physical-to-virtual address translations within the platform hardware I/O control service, assuring that all virtual addresses fall within the memory areas allocated for I/O buffers (1140);
6. Publish and assure peer review of the source code for the platform hardware I/O control service;
7. Define an architected software interface that permits an I/O driver, solely using virtual addresses, to supply encoded directions to the I/O platform control service that result in the actual reads and writes to I/O control adapters (1110 and 1120);

8. In such encoded directions specify hardware adapter control register addresses indirectly, employing a descriptor of the adapter contained within the platform I/O hardware control services (1150); after encoding the I/O directives, an authenticated call, as described earlier, is made to I/O hardware control services (1130 and 1160);

9. For memory data structures containing physical addresses, provide services to permit the I/O driver to: (1) obtain addressability to a data page within which the data structures can be constructed using virtual addresses; (2) transfer ownership of the data page back to the I/O hardware control services, at which time the services will translate virtual addresses to physical addresses and assure that the addresses fall within the memory areas allocated for I/O buffers (1140); and (3) translate any physical addresses read from an I/O adapter back to virtual addresses that are returned to the I/O driver (1140). The memory organization of Itanium embodiments of the present invention permits translations to be done in either direction—the Itanium tpa (translate to physical address) instruction can be used in one direction; a binary search of the starting physical addresses of the pages allocated for I/O buffers can be used in the other.

This design approach, in effect, defines an enforced software interface that requires and enables I/O drivers to function using only virtual memory addresses. This prevents I/O drivers from using physical memory addresses, and closes the security exposure from malicious I/O drivers. A result is that critical secret data, such as cryptography keys and keying materials, secure policy data bases, and random data safely can reside in virtual memory compartments for long periods of time.

Secure Boot, Secure Loading

It is expected that future systems will have the capability to boot securely. Booting securely means that when control first is passed to an operating system loader, or to a $CE^2$ loader, the implementer of the loader may rely upon the fact that when the loader begins to execute it has full control of the system, that its integrity is assured (the code has not been altered in any manner), and that the execution path to the loader passed only through firmware code modules whose integrity also was assured. One possible embodiment for booting securely is described in U.S. patent application Ser. No. 10/118,646 ("the '646 application") entitled "Secure Machine Platform that Interfaces to Operating Systems and Customized Control Programs" published on Dec. 19, 2002 as Publication No. 2002/0194389 A1, which is hereby incorporated by reference in its entirety. An embodiment within the '646 application described a "chain of trust," commencing with hardware validation of the integrity of a first firmware module to be executed, and extended by having the first and each subsequent module validate the integrity of its successor module before passing control to it. Validation in the embodiment described in the '646 application utilizes cryptographic digital signatures.

Present hardware platforms do not establish such a chain of trust when booting. Until hardware platforms are available that establish such a chain of trust when booting, one option for establishing the integrity of $CE^2$ loader, code, and data images includes a new root of the chain of trust being established at the $CE^2$ loader. Once the $CE^2$ loader integrity has been established, it then can extend the chain of trust through all modules of the $CE^2$ by validating their digital signatures.

Itanium embodiments of the present invention will employ loaders that can extend a chain of trust. Once hardware platforms can boot securely, this can result in a secure boot and load of an operating system and concurrent $CE^2$, or solely of a $CE^2$. Until hardware platforms can boot securely, Itanium embodiments of the present invention may take alternative approaches to increase the level of trust in a $CE^2$ loader:

1. In installations where physical security is enforced, an EFI utility can be provided to compute and print out cryptographic hashes of the internal monarch processor firmware and of a small, first phase of a CE2 loader. When first executed, the hash values computed by this utility can be recorded in human readable form, or transmitted to a management system. For subsequent boots, or for periodic sampling, this utility can be executed again to produce hashes that can be compared with the original values before booting the CE2. This is a reasonable check of the integrity of the system internal firmware and the $CE^2$ loader. The utility and $CE^2$ system can be distributed on CD-ROMs, which must be kept securely. If the system also can boot a ULW operating system, a version of the utility can be run under the operating system to cross check the values produced by the EFI version. This is an approach that raises confidence in the $CE^2$ loader, but falls short of establishing a new root of trust.

2. If the system contains a separate plug-in board that can be a bus master and can contain a customized read-only program, a root of trust may be established for a small, first phase of a $CE^2$ loader in accordance with FIG. 12A. In this example, the small, first phase of the CE2 loader is loaded by the EFI firmware at block 1205. Once loaded, the first phase may send a first signal to the separate plug-in board, then enter a first infinite loop executing in uncached memory (1210). The separate plug-in board then first may scan the system firmware and verify its digital signature, then read the code image of the first phase of the CE2 loader and verify its digital signature. Once these signatures are verified, the separate plug-in board next may write one or more instructions into uncached memory, finally over-writing the first infinite loop branch to terminate the infinite loop (1215). The instructions written by the separate plug-in board may include instructions to access a random number provided within the instructions written to memory by the separate plug-in board (1215), to send a second signal including this random number to the separate plug-in board, and to enter a second infinite loop (1220). The separate plug-in board then may time the duration between writing the instruction to terminate the first infinite loop and receiving the second signal. A sufficiently small duration and the receipt of the just-supplied random number indicate that the instructions written by the separate plug-in board, to terminate the first infinite loop and continue, are executing (1225). If these conditions are met, the separate plug-in board next writes instructions to terminate the second infinite loop (1225); other instructions written by the separate plug-in board at the same time call the firmware to load a second and last phase of the CE2 loader at a fixed physical address; validate the digital signature of said second phase of the CE2 loader (1230); and transfer control to said second phase (1235). From this point, the CE2 loader extends the chain of trust.

3. Physical security of the read-only program storage on the external card must be assured, but the boot process is automatic rather than requiring manual steps. If the separate plug-in board determines that the digital signatures of the system firmware or loader cannot be validated, the instructions generated to terminate either the first or second infinite loop will cause the system to print an error message and terminate the boot process.

4. To those skilled in the art, it will be apparent that there are a number of possible variations of the second approach, such as dividing the process described above into more phases, modifying or embellishing the protocols between the monarch processor and the separate plug-in board, or employing a built-in security chip in either the monarch processor or the separate plug-in board.

Until hardware platforms have the capability to boot securely, the above approaches combined with physical security appear workable, particularly if the boot code within a separate plug-in board used as described above entirely can reside in read-only memory.

In Itanium embodiments of the present invention the reason to validate the digital signature only of a first phase of the CE2 loader is that EFI programs may be loaded, relocated, and executed by the firmware at unpredictable physical addresses. This, in effect, means that the loaded image of the full loader has no constant digital signature. The signature will be different for each physical load address. This problem may be avoided for a small first phase of a CE2 loader, by making its code sufficiently simple. Once the first phase has been validated, it then can instruct EFI to load the full second phase of a CE2 loader to be loaded at a specific physical address, which then permits the first phase to validate the digital signature of the second phase.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-readable medium having a customized execution engine stored therein, the customized execution engine comprising:
    code and data sections of a set of or more applications; and
    code and data sections of a set of system services, the set of system services having direct and full control of a set of hardware resources of a computer system containing one or more processors implementing a parallel protected architecture, the set of system services using hardware features that are not used by traditional operating systems, the set of system services limited to only those services required by the set of one or more applications, the set of one or more applications together implementing a control flow structure by using only a single thread of execution in each of one or more processors, the customized execution engine unable to load or to load and execute applications in addition to the set of one or more applications.

2. The computer-readable medium of claim 1, wherein the customized execution environment makes full use of capabilities of the computer system, including capabilities not supported by a traditional operating system.

3. The computer-readable medium of claim 1, wherein the set of system services is strictly limited to only those services required by the application.

4. The computer-readable medium of claim 1, wherein the set of system services enable the application to recover and continue following a system error.

5. The computer-readable medium of claim 1, wherein the application and the set of system services are non-portable.

6. The computer-readable medium of claim 1, wherein the set of system services utilize no general-purpose operating system abstractions.

7. The computer-readable medium of claim 1, wherein the set of system services employ entirely different resource management strategies than those used by a general-purpose operating system.

8. A method comprising:
    a customized execution environment providing, to a set of one or more applications together implementing a control flow structure,
        only a single thread of execution on each of one or more processors, the customized execution engine unable to load or to load and execute applications in addition to the set of one or more applications, and
        a set of system services to the set of one or more applications, the set of system services having direct and full control of a set of hardware resources of a computer system containing one or more processors implementing a parallel protected architecture, the set of system services using hardware features that are not used by traditional operating systems, the set of system services limited to only those services required by the set of one or more applications; and
    the set of one or more applications performing both normal application tasks and tasks that occur as a result of events external to the application using only the single thread on each of the one or more processors.

9. The method of claim 8, further comprising responsive to an interrupt, an interruption control service receiving control of the single thread, setting state to cause control of the single thread to flow first to one or more interruption service routines (ISRs) corresponding to the interrupt and later to flow to one or more deferred interruption service routines (DISRs).

10. The method of claim 8, further comprising:
    an I/O driver of a minimum set of I/O drivers using only the single thread on each processor, operating solely using virtual addresses, and generating encoded directives specifying steps needed to perform an I/O operation; and
    the I/O driver calling platform control services to control an I/O device, the platform control services using physical addresses by following encoded directives supplied by the I/O driver.

11. A method comprising:
    a caller executing within a customized execution environment;
    the caller invoking a system service call of a set of system services provided by the customized execution environment, the set of system services having direct and full control of a set of hardware resources of a computer system containing one or more processors implementing a parallel protected architecture, the set of system services using hardware features that are not used by traditional operating systems, the set of system services limited to only those services required by the set of one or more applications, the set of one or more applications together implementing a control flow structure by using only a single thread of execution in each of one or more processors; and
    the system service call causing a call return address associated with the system service call by the application to be verified.

12. The method of claim 11, wherein said verifying a call return address is performed via an intermediate system service of the customized execution environment.

13. The method of claim 11, wherein said verifying a call return address is performed with reference to one or more data structures initialized during loading of the customized execution environment and application.

14. The method of claim 13, wherein a first data structure of the one or more data structures comprises a call table and a second data structure of the one or more data structures comprises a path table.

15. The method of claim 14, wherein the path table contains one or more random numbers at specific locations, and wherein the call table includes the call return address, one or more random numbers supplied by a customized execution environment loader, a specific path table entry location, and a disposition parameter indicating modifications, if any, to the path table to be executed during the system service call.

16. The method of claim 15, further comprising verifying flow of the caller had reached the call point after passing through a back dominating instruction in the flow path to the caller by comparing a first random number of the one or more random numbers in the call table to a second random number of the one or more random numbers at a specific location in the path table.

17. The method of claim 16, further comprising verifying a random number associated with the back dominating instruction.

18. The method of claim 11, wherein the caller executes at a first privilege level of a plurality of privilege levels, wherein the called system service executes at the same or higher privilege level of the plurality of privilege levels.

19. The method of claim 11, further comprising:
an I/O driver of a minimum set of I/O drivers using only the single thread on each processor, operating solely using virtual addresses, and generating encoded directives specifying steps needed to perform an I/O operation; and
the I/O driver calling platform control services to control an I/O device, the platform control services using physical addresses by following encoded directives supplied by the I/O driver.

20. A computer-readable medium having a customized execution engine encoded in computer instructions and stored therein, comprising:
a customized execution environment that provides:
a minimum set of I/O drivers for a particular application, and
a set of system services having direct and full control of a set of hardware resources of a computer system containing one or more processors implementing a parallel protected architecture, the set of system services using hardware features that are not used by traditional operating systems, the set of system services limited to only those services required by the set of one or more applications, the set of one or more applications together implementing a control flow structure by using only a single thread of execution in each of one or more processors, the customized execution engine unable to load or to load and execute applications in addition to the set of one or more applications;
an I/O driver of a minimum set of I/O drivers operating solely using virtual addresses and generating encoded directives specifying steps needed to perform an I/O operation; and
the I/O driver calling platform control services to control an I/O device, the platform control services using physical addresses by following encoded directives supplied by the I/O driver.

21. The computer-readable medium of claim 20, wherein the encoded directives specify I/O controller addresses indirectly through an I/O controller descriptor residing in a compartment accessible only by one or more of the platform control services.

* * * * *